United States Patent
Kumagai

(10) Patent No.: US 12,374,129 B2
(45) Date of Patent: Jul. 29, 2025

(54) OCCUPANT DETECTION DEVICE, OCCUPANT DETECTION SYSTEM, AND OCCUPANT DETECTION METHOD

(71) Applicant: Mitsubishi Electric Corporation, Tokyo (JP)

(72) Inventor: Taro Kumagai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 172 days.

(21) Appl. No.: 18/278,949

(22) PCT Filed: Mar. 16, 2021

(86) PCT No.: PCT/JP2021/010587
§ 371 (c)(1),
(2) Date: Aug. 25, 2023

(87) PCT Pub. No.: WO2022/195715
PCT Pub. Date: Sep. 22, 2022

(65) Prior Publication Data
US 2024/0135729 A1  Apr. 25, 2024
US 2024/0233405 A9  Jul. 11, 2024

(51) Int. Cl.
*G06V 20/59* (2022.01)
*B60R 16/023* (2006.01)

(52) U.S. Cl.
CPC ........ *G06V 20/593* (2022.01); *B60R 16/0231* (2013.01); *G06V 20/597* (2022.01)

(58) Field of Classification Search
CPC .... G06V 20/593; G06V 20/597; G06V 40/16; G06V 20/59; B60R 16/0231
See application file for complete search history.

(56) References Cited

U.S. PATENT DOCUMENTS 6,407,389 B1 * 6/2002 Nishii ............... H04N 23/55
348/E5.09
2011/0228117 A1  9/2011 Inoue
(Continued)

FOREIGN PATENT DOCUMENTS

DE  10 2019 125 627 A1  3/2020
DE  11 2018 007 120 T5  11/2020
(Continued)

OTHER PUBLICATIONS

International Search Report, issued in PCT/JP2021/010587, PCT/ISA/210, dated May 25, 2021.
(Continued)

*Primary Examiner* — Behrang Badii
(74) *Attorney, Agent, or Firm* — Birch, Stewart, Kolasch & Birch, LLP

(57) ABSTRACT

There is provided an occupant detection device with a reduced processing load.
An occupant detection device includes an image obtainer to obtain a captured image from an imaging device including, in an imaging range, a driver present in a driver seat of a vehicle and a passenger present in a passenger seat or a rear seat of the vehicle, an occupant detector to obtain the captured image from the image obtainer, the occupant detector being capable of detecting the driver and the passenger in the captured image, and a detection target determiner to determine whether a detection target of the occupant detector is one of occupants of the driver and the passenger or both of the occupants of the driver and the passenger.

18 Claims, 10 Drawing Sheets

(56) References Cited

U.S. PATENT DOCUMENTS

| | | | |
|---|---|---|---|
| 2013/0018549 A1 | 1/2013 | Kobana et al. | |
| 2015/0078632 A1 | 3/2015 | Hachisuka et al. | |
| 2018/0285635 A1 | 10/2018 | Arata et al. | |
| 2018/0357484 A1* | 12/2018 | Omata | G06V 20/588 |
| 2019/0260970 A1* | 8/2019 | Lu | G06T 3/4038 |
| 2020/0098128 A1 | 3/2020 | Fujii et al. | |
| 2020/0290544 A1* | 9/2020 | Saito | B60R 21/01552 |
| 2021/0001796 A1 | 1/2021 | Kudo et al. | |
| 2021/0309232 A1* | 10/2021 | Goto | G06V 20/58 |

FOREIGN PATENT DOCUMENTS

| | | |
|---|---|---|
| DE | 11 2021 006 342 T5 | 10/2023 |
| JP | 2018-173756 A | 11/2018 |
| JP | 2018/185157 A | 11/2018 |
| WO | WO 2010/064405 A1 | 6/2010 |
| WO | WO 2013/008299 A1 | 1/2013 |
| WO | WO 2013/153781 A1 | 10/2013 |

OTHER PUBLICATIONS

Notice of Reasons for Refusal for Japanese Application No. 2023-506437, dated Jun. 13, 2023.

German Office Action for German Application No. 11 2021 006 812.1, dated Dec. 3, 2024, with English translation.

* cited by examiner

OCCUPANT DETECTION DEVICE, OCCUPANT DETECTION SYSTEM, AND OCCUPANT DETECTION METHOD

TECHNICAL FIELD

The present disclosure relates to an occupant detection device and an occupant detection system that detect an occupant in a vehicle.

BACKGROUND ART

In order to prevent dozing driving and perform a vehicle evacuation process in an emergency when a physical condition of an occupant suddenly changes, a technique of detecting the occupant and performing notification of a warning, vehicle control, and the like depending on the state of the occupant has been developed. Conventionally, vehicle control has been performed on the basis of a physical condition of a driver, such as detecting an occupant by analyzing a captured image capturing the inside of a vehicle, and performing a vehicle evacuation process when the physical condition of the occupant is abnormal or deteriorated (see, for example, Patent Literature 1).

CITATION LIST

Patent Literature

Patent Literature 1: WO 2013/008299 A

SUMMARY OF INVENTION

Technical Problem

In detection of an occupant in a vehicle, it is required to detect a driver present in a driver seat and also detect a passenger present in a passenger seat or a rear seat. However, in a case where the driver and the passenger are detected, there is a problem that a heavy processing load occurs when occupant detection processing is performed on all seats every time.

The present disclosure has been made to solve the above-described problem, and an object thereof is to reduce a processing load of occupant detection processing in an occupant detection device in which occupants of both a driver and a passenger are the detection target.

Solution to Problem

An occupant detection device according to the present disclosure includes an image obtainer to obtain a captured image from an imaging device, where in an imaging range of the image obtainer includes a driver present in a driver seat of a vehicle and a passenger present in a passenger seat or a rear seat of the vehicle; an occupant detector to obtain the captured image from the image obtainer, the occupant detector being capable of detecting the driver and the passenger in the captured image; and a detection target determiner to determine whether a detection target of the occupant detector is one of occupants of the driver and the passenger or both of the occupants of the driver and the passenger; wherein the occupant detector, when the detection target determiner determines the detection target as the one of the occupants, detects the one of the occupants in the captured image, and when the detection target determiner determines the detection target as both the occupants, detects both the occupants in the captured image.

Furthermore, an occupant detection system according to the present disclosure includes an imaging device being mounted in a vehicle, where in an imaging range of the imaging device includes a driver present in a driver seat of the vehicle and a passenger present in a passenger seat or a rear seat of the vehicle; an image obtainer to obtain a captured image from the imaging device; an occupant detector to obtain the captured image from the image obtainer, the occupant detector being capable of detecting the driver and the passenger in the captured image; and a detection target determiner to determine whether a detection target of the occupant detector is one of occupants of the driver and the passenger or both of the occupants of the driver and the passenger; wherein the occupant detector, when the detection target determiner determines the detection target as the one of the occupants, detects the one of the occupants in the captured image, and when the detection target determiner determines the detection target as both the occupants, detects both the occupants in the captured image.

Also, an occupant detection method according to the present disclosure includes, obtaining, by an image obtainer, a captured image from an imaging device, where in an imaging range of the image obtainer includes a driver present in a driver seat of a vehicle and a passenger present in a passenger seat or a rear seat of the vehicle, obtaining, by an occupant detector, the captured image from the image obtainer, the occupant detector being capable of detecting the driver and the passenger in the captured image, and determining, by a detection target determiner, whether a detection target of the occupant detector is one of occupants of the driver and the passenger or both of the occupants of the driver and the passenger, wherein the occupant detector, when the detection target determiner determines the detection target as the one of the occupants, detects the one of the occupants in the captured image, and when the detection target determiner determines the detection target as both the occupants, detects both the occupants in the captured image.

Advantageous Effects of Invention

According to the present disclosure, in an occupant detection device that detects both occupants of a driver and a passenger as a detection target, only one of the occupants of the driver or the passenger is determined as a detection target as necessary, and thus a processing load of occupant detection processing can be reduced.

DESCRIPTION OF EMBODIMENTS

Hereinafter, embodiments will be described with reference to the drawings.

First Embodiment

Figure 1:
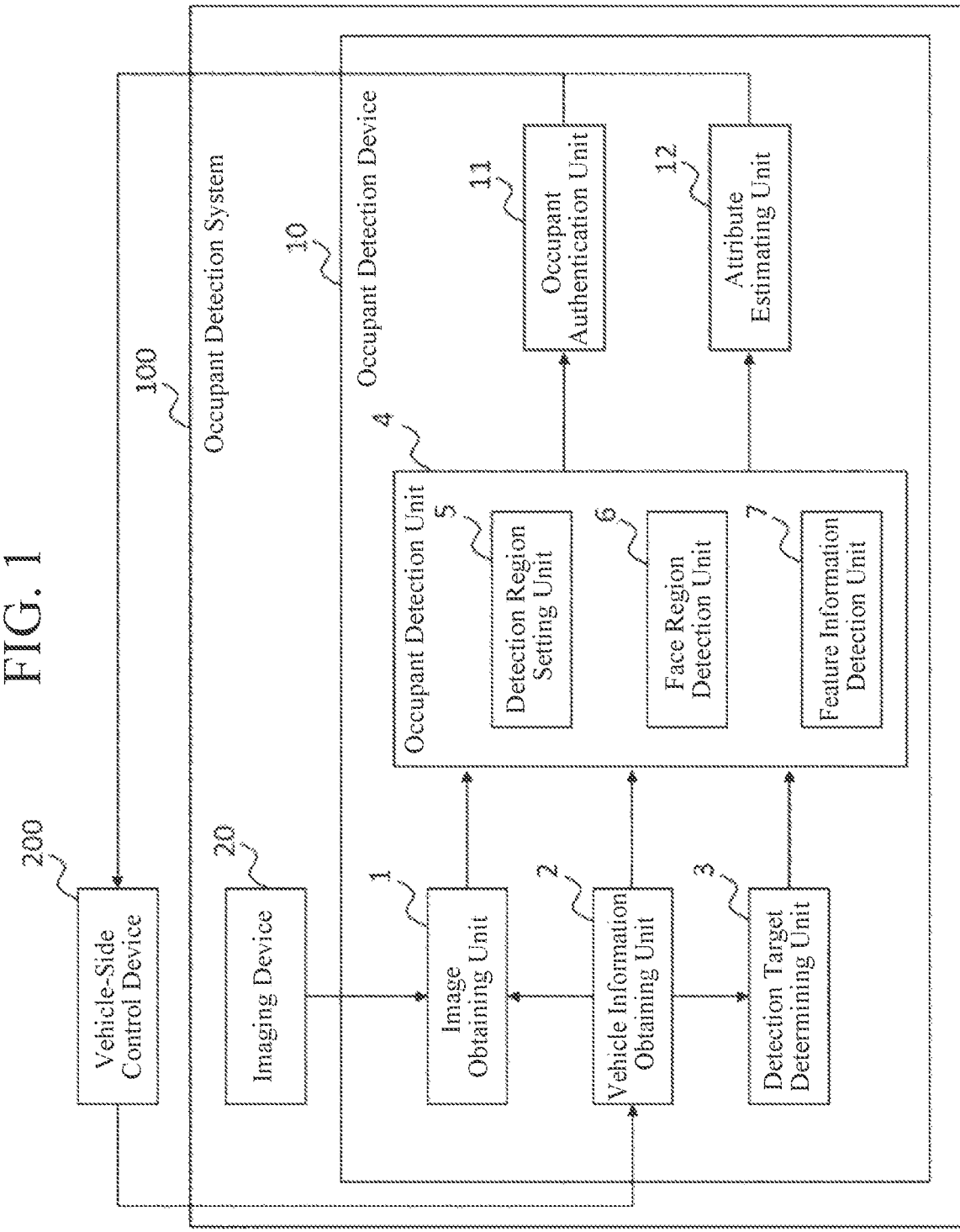
FIG. 1 is a block diagram illustrating a configuration example of an occupant detection system according to a first embodiment.

FIG. 1 is a block diagram illustrating a configuration example of an occupant detection system 100 according to a first embodiment. The occupant detection system 100 includes an occupant detection device 10 and an imaging device 20, and the occupant detection device 10 and the imaging device 20 are mounted on a vehicle. Further, the occupant detection device 10 is connected to a vehicle-side control device 200 that controls an onboard device such as an air conditioning device, an acoustic device, a navigation device, and a notification unit, an engine, and the like in the vehicle on which the occupant detection device 10 is mounted.

Figure 2A:
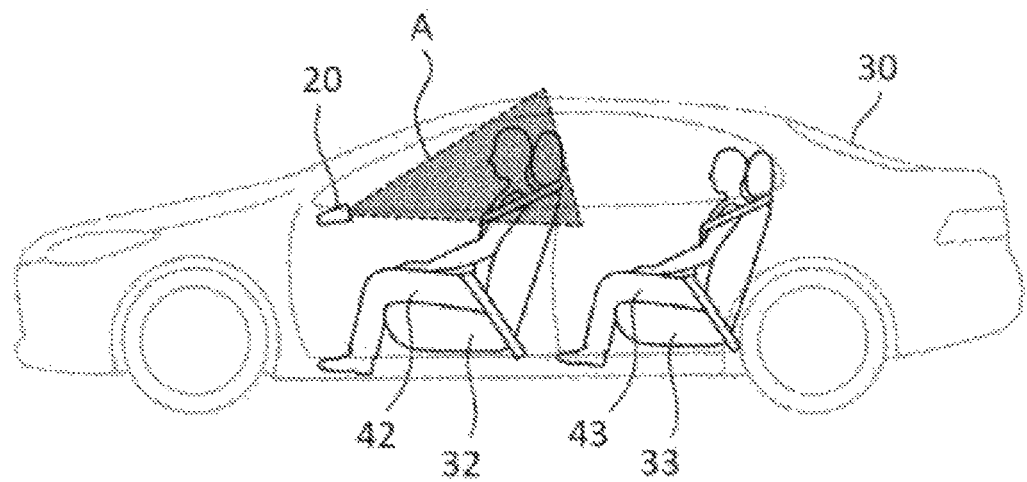
FIG. 2A and FIG. 2B are explanatory diagrams illustrating an imaging range of an imaging device according to the first embodiment.
Figure 2B:
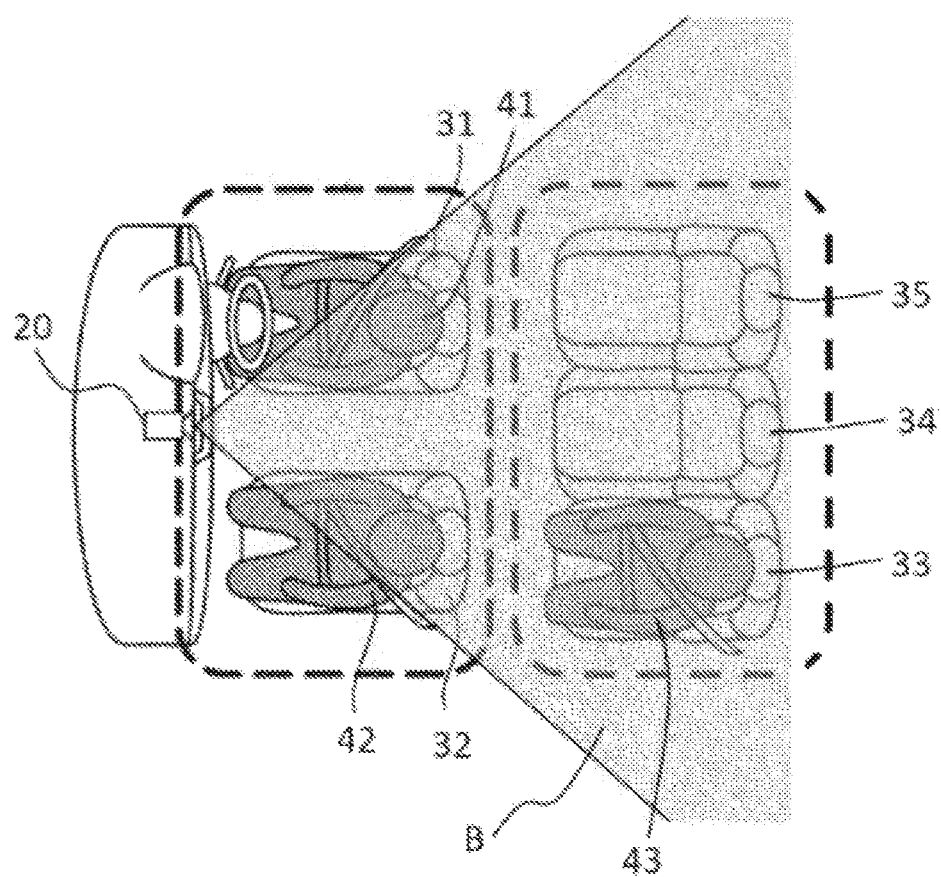

FIG. 2A and FIG. 2B are explanatory diagrams illustrating an imaging range of the imaging device 20 according to the first embodiment. FIG. 2A is a side view of the inside of a vehicle 30 on which the occupant detection device 10 is mounted, and FIG. 2B is a top view of the inside of the vehicle 30 on which the occupant detection device 10 is mounted. The imaging device 20 includes, for example, a wide-angle camera, an infrared camera, or the like, and images the inside of the vehicle 30. Furthermore, the imaging device 20 may be a time-of-flight (TOF) camera capable of capturing an image reflecting the distance between the imaging device 20 and a subject. The imaging device 20 captures images of the inside of the vehicle 30 at intervals of, for example, 30 to 60 frames per second (fps), and outputs the captured images (hereinafter referred to as a captured image) to an image obtaining unit 1 included in the occupant detection device 10.

In the example of FIG. 2A, an imaging range of the imaging device 20 is indicated by a region A. One or more imaging devices 20 are disposed on an overhead console, an instrument panel, a steering column, a rear-view mirror, and the like so that at least a driver 41 in the driver seat and an occupant 42 in the passenger seat, that is, a passenger are included in the imaging range.

Furthermore, in the example of FIG. 2B, the imaging range of the imaging device 20 is indicated by a region B. As illustrated in FIG. 2B, the imaging device 20 may be disposed to be capable of imaging the driver 41 and, for example, an occupant present in the rear seat such as an occupant 43 present in a rear left seat 33, that is, a passenger. That is, the imaging range of the imaging device 20 may include, for example, at least one of a rear left seat 33, a rear center seat 34, and a rear right seat 35 in addition to the driver seat and the passenger seat. Hereinafter, each of the driver and the passenger to be a detection target by the occupant detection device 10 may be referred to as an "occupant".

Returning to FIG. 1, the occupant detection device 10 will be described. The occupant detection device 10 includes the image obtaining unit 1 that obtains a captured image from the imaging device 20, an occupant detection unit 4 that can detect a driver and a passenger in the captured image, and a detection target determining unit 3 that determines whether a detection target of the occupant detection unit 4 is one of occupants of the driver and the passenger or both the occupants of the driver and the passenger.

The image obtaining unit 1 of the occupant detection device 10 is connected to the imaging device 20 and obtains a captured image from the imaging device 20. Then, the image obtaining unit 1 outputs the obtained captured image to the occupant detection unit 4 described later. Further, as illustrated in FIG. 1, the image obtaining unit 1 is connected to a vehicle information obtaining unit 2 described below. When the image obtaining unit 1 obtains a signal indicating starting of detection of an occupant from the vehicle information obtaining unit 2, the image obtaining unit 1 starts obtaining of the captured image. On the other hand, the image obtaining unit 1 ends the obtaining of the captured image when a signal indicating ending of detection of the occupant is obtained from the vehicle information obtaining unit 2.

The occupant detection device 10 includes the vehicle information obtaining unit 2 connected to the vehicle-side control device 200. The vehicle information obtaining unit 2 obtains a signal related to start, stop, or the like of the vehicle from the vehicle-side control device 200. Using the signal obtained from the vehicle-side control device 200, a signal indicating starting of obtaining of the captured image or a signal indicating ending of obtaining of the captured image is output to the image obtaining unit 1.

For example, when the vehicle information obtaining unit 2 obtains, from the vehicle-side control device 200, any of signals indicating unlocking of doors, opening of a door, turning on of the ignition, turning on of a human sensor, the shift lever moving to the drive position, the vehicle speed exceeding 0 km/h, the navigation device starting guiding, the vehicle leaving home, or the like, the vehicle information obtaining unit 2 outputs the signal indicating starting of obtaining the captured image to the image obtaining unit 1. On the other hand, for example, when the vehicle information obtaining unit 2 obtains, from the vehicle-side control device 200, a signal indicating turning off of the ignition, turning off of the human sensor, the shift lever moving to the parking position, the navigation device finishing guiding, the vehicle returning home, or the like, the vehicle information obtaining unit 2 outputs the signal indicating ending of obtaining of the captured image to the image obtaining unit 1.

Furthermore, the vehicle information obtaining unit 2 is connected to the detection target determining unit 3. The detection target determining unit 3 according to the present embodiment obtains vehicle information from the vehicle information obtaining unit 2, and determines whether a detection target of the occupant detection unit 4 is one of occupants or both the occupants by using the vehicle information.

By the way, when the occupant detection device 10 detects a passenger in addition to the driver, it is possible to implement various functions such as enabling the vehicle-side control device 200 to adjust the seat position suitable for the detected physique and the like of the passenger. On the other hand, even if the detection target of the occupant detection device 10 is the driver and the passenger, in a case where the driver feels drowsy and there is a risk of dozing driving, or the like, which has a large influence on safety during driving, it is preferable to allocate processing cost to the detection processing of the driver in order to immediately and accurately detect the state such as the drowsiness of the driver. As described above, in the occupant detection device 10, various functions can be implemented when both the occupants of the driver and the passenger are detected, but there may be a case where it is preferable to allocate processing cost to detection processing of one of the occupants, that is, the driver.

Accordingly, the detection target determining unit 3 according to the present embodiment determines that the detection target of the occupant detection unit 4 is both the occupants, that is, the driver and the passenger when the influence on safety is conceivable to be small during driving, and determines that the detection target of the occupant detection unit 4 is one of the occupants, that is, the driver when the influence on safety is conceivable to be large during driving.

For example, it is conceivable that the wakefulness level of the driver and the attention level to driving are high until a set time elapses after the occupant gets in the vehicle. Therefore, it is conceivable that the influence on safety during driving is small until the set time elapses after the occupant gets in the vehicle. In addition, for example, in order for the vehicle-side control device 200 to adjust the seat position or the like with respect to the seat on which the passenger is seated, it is preferable that the occupant detection device 10 detect the passenger when the passenger gets in the vehicle.

On the other hand, for example, when the set time has elapsed since the occupant got into the vehicle, it is conceivable that the driver has started driving the vehicle, and the influence on safety is large during driving. Therefore, when a passenger gets in the vehicle, the detection target determining unit 3 determines that the detection target of the occupant detection unit 4 is both the occupants, that is, the driver and the passenger, and when the set time has elapsed since the passenger gets in the vehicle, the detection target determining unit 3 determines that the detection target of the occupant detection unit 4 is one of the occupants, that is, the driver.

Next, an example of vehicle information obtained by the detection target determining unit 3 and a determination example of the detection target determining unit 3 will be described. For example, when obtaining vehicle information indicating that the door of the passenger seat or the rear seat has been opened or closed, the detection target determining unit 3 determines that the passenger has got in the vehicle, and determines that the driver and the passenger are the detection target. Then, when the set time has elapsed after determining that the passenger gets in the vehicle and the driver and the passenger are the detection target, the detection target determining unit 3 determines then that the driver is the detection target. For example, it is sufficient that, after determining that the driver and the passenger are the detection target, the detection target determining unit 3 starts counting the elapsed time or the like, and determines that the driver is to be the detection target when the elapsed time exceeds the set time.

On the other hand, when the detection target determining unit 3 does not obtain the vehicle information indicating that the door of the passenger seat or the rear seat has been opened or closed, the detection target determining unit 3 determines that the passenger is not in the vehicle and determines that the driver is the detection target. Note that the detection target determining unit 3 may determine that a passenger present in a seat corresponding to the opened and closed door is the detection target, such as determining that not only the driver but also a passenger present in the passenger seat is the detection target when the door of the passenger seat is opened and closed, and determining that not only the driver but also a passenger present in the rear seat is the detection target when the door of the rear seat is opened and closed. Further, the opening and closing of the door includes not only opening and then closing of the door but also opening of a closed door or closing of an open door.

Further, determination processing by the detection target determining unit 3 is not limited to the above example. For example, the detection target determining unit 3 may obtain sensor information regarding the presence or absence of an occupant from a radio wave sensor (not illustrated) provided on the ceiling or the like of the vehicle interior, and determine that the detection target of the occupant detection unit 4 is to be the driver and the passenger, assuming that the passenger gets in the vehicle, when a state in which the passenger is not present in the vehicle changes to a state in which the passenger is present in the vehicle. Here, the sensor information regarding the presence or absence of the occupant is information regarding a moving body in the vehicle detected by the radio wave sensor. Also in this case, it is sufficient that, after determining that the driver and the passenger are the detection target, for example, when the set time has elapsed, the detection target determining unit 3 determines that the driver is to be the detection target.

Furthermore, the detection target determining unit 3 may determine that the detection target of the occupant detection unit 4 is both the occupants when a passenger gets in the vehicle, or may determine that the detection target of the occupant detection unit 4 is one of the occupants, that is, the driver, when seating of the driver and the passenger in the seats is detected. In this case, it is sufficient if the seating of the driver and the passenger in the seats is detected by, for example, a seating sensor (not illustrated) mounted on the vehicle. After the seating of the driver and the passenger in the seats is completed, the driving of the vehicle is started, that is, the influence on safety is increased during driving, and thus it is preferable to determine the driver as the detection target. Thus, if the detection target of the occupant detection unit 4 is determined as the driver when seating of the driver and the passenger in the seats is detected, the processing load of the occupant detection processing can be reduced when the influence on safety is large during driving.

Next, the occupant detection unit 4 of the occupant detection device 10 will be described. The occupant detection unit 4 includes a detection region setting unit 5 that sets a detection region in the captured image, a face region detection unit 6 that detects a region where the face of the occupant is present in the detection region, and a feature information detection unit 7 that detects feature information of the occupant. Hereinafter, an example in which the occupant detection unit 4 detects the face of the occupant and performs the occupant detection processing will be described.

Figure 3:
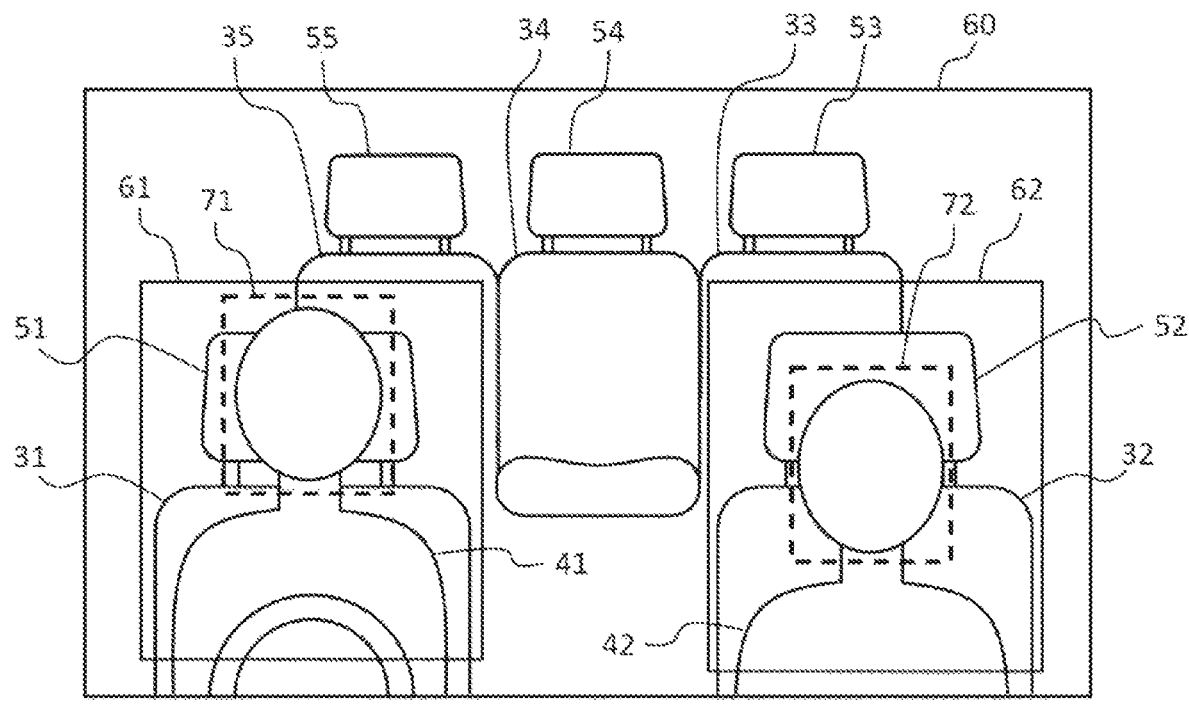
FIG. 3 is an explanatory diagram illustrating an occupant detection example of an occupant detection device according to the first embodiment.

The detection region setting unit 5 of the occupant detection unit 4 sets a detection region in which the face region detection unit 6 described below detects the face of the occupant in the captured image obtained by the image obtaining unit 1. FIG. 3 is an explanatory diagram illustrating an occupant detection example of the occupant detection device 10 according to the first embodiment. FIG. 3 illustrates an example in which the driver 41 seated on a driver seat 31 and the occupant 42 who is a passenger seated on a passenger seat 32 are imaged in a captured image 60. In addition, regions 61 and 62 in FIG. 3 are examples of the detection region, and regions 71 and 72 are examples of the face region. Note that details of the face region will be described later.

First, the detection region will be described. The detection region is a region set corresponding to a seat on which an occupant to be a detection target is seated. The detection region 61 corresponding to the driver seat 31 is, for example, a rectangular region set in the captured image 60 so as to include a headrest 51 of the driver seat 31. The position of the upper side of the detection region 61 is set to a position separated by a predetermined distance (for example, about 5 cm) from the upper side face of the headrest 51 of the driver seat 31 to the ceiling side of the vehicle interior. The position of the right side of the detection region 61 is set to a position separated from the right side face of the headrest 51 to the right by a predetermined distance (for example, about 10 cm). The position of the left side of the detection region 61 is set to a position separated from the left side face of the headrest 51 to the left by a predetermined distance (for example, about 10 cm). The position of the lower side of the detection region 61 is set to a position separated from the lower side face of the headrest 51 toward the lower side of the vehicle by a predetermined distance (for example, about 15 cm).

The detection region 62 corresponding to the passenger seat 32 is, for example, a rectangular region set in the captured image 60 so as to include a headrest 52 of the passenger seat 32. The position of the upper side of the detection region 62 is set to a position separated by a predetermined distance (for example, about 5 cm) from the upper side face of the headrest 52 of the passenger seat 32 to the ceiling side of the vehicle interior. The position of the right side of the detection region 62 is set to a position separated from the right side face of the headrest 52 to the right by a predetermined distance (for example, about 10 cm). The position of the left side of the detection region 62 is set to a position separated from the left side face of the headrest 52 to the left by a predetermined distance (for example, about 10 cm). The position of the lower side of the detection region 62 is set to a position separated from the lower side face of the headrest 52 toward the lower side of the vehicle by a predetermined distance (for example, about 15 cm).

The detection region (not illustrated) corresponding to the rear left seat 33 is, for example, a rectangular region set in the captured image 60 so as to include a headrest 53 of the rear left seat 33. The position of the upper side of the detection region corresponding to the rear left seat 33 is set to a position separated by a predetermined distance (for example, about 5 cm) from the upper side face of the headrest 53 of the rear left seat 33 toward the ceiling side in the vehicle interior. The position of the right side of the detection region corresponding to the rear left seat 33 is set to a position separated from the right side face of the headrest 53 to the right by a predetermined distance (for example, about 10 cm). The position of the left side of the detection region corresponding to the rear left seat 33 is set to a position separated from the left side face of the headrest 53 to the left by a predetermined distance (for example, about 10 cm). The position of the lower side of the detection region corresponding to the rear left seat 33 is set to a position separated from the lower side face of the headrest 53 toward the lower side of the vehicle by a predetermined distance (for example, about 15 cm).

The detection region (not illustrated) corresponding to the rear center seat 34 is, for example, a rectangular region set in the captured image 60 so as to include a headrest 54 of the rear center seat 34. The position of the upper side of the detection region corresponding to the rear center seat 34 is set to a position separated by a predetermined distance (for example, about 5 cm) from the upper side face of the headrest 54 of the rear center seat 34 toward the ceiling side in the vehicle interior. The position of the right side of the detection region corresponding to the rear center seat 34 is set to a position separated from the right side face of the headrest 54 to the right by a predetermined distance (for example, about 10 cm). The position on the left side of the detection region corresponding to the rear center seat 34 is set to a position separated from the left side face of the headrest 54 to the left by a predetermined distance (for example, about 10 cm). The position of the lower side of the detection region corresponding to the rear center seat 34 is set to a position separated from the lower side face of the headrest 54 toward the lower side of the vehicle by a predetermined distance (for example, about 15 cm).

The detection region (not illustrated) corresponding to the rear right seat 35 is, for example, a rectangular region set in the captured image 60 so as to include a headrest 55 of rear right seat 35. The position of the upper side of the detection region corresponding to the rear right seat 35 is set to a position separated by a predetermined distance (for example, about 5 cm) from the upper side face of the headrest 55 of the rear right seat 35 toward the ceiling side in the vehicle interior. The position of the right side of the detection region corresponding to the rear right seat 35 is set to a position separated from the right side face of the headrest 55 to the right by a predetermined distance (for example, about 10 cm). The position on the left side of the detection region corresponding to the rear right seat 35 is set to a position separated from the left side face of the headrest 55 to the left by a predetermined distance (for example, about 10 cm). The position of the lower side of the detection region corresponding to the rear right seat 35 is set to a position separated from the lower side face of the headrest 55 toward the lower side of the vehicle by a predetermined distance (for example, about 15 cm).

Here, it is preferable that the dimension in each detection region set corresponding to each seat is appropriately set so as not to overlap with different detection regions. Furthermore, when the occupant detection unit 4 detects the driver, the detection region corresponding to the driver seat 31 may be set, and when the occupant detection unit 4 detects the driver and the passenger, the detection region may be set so as to include the driver and the passenger such as the entire captured image. Further, the setting of the detection region described above is an example, and can be appropriately applied as long as it is a setting with which an occupant present in the corresponding seat can be detected. Note that the above-described dimensions of the detection region are not exemplary dimensions in the captured image, but exemplary dimensions based on actual measured values in the vehicle.

When the detection target determining unit 3 determines that the detection target is one of occupants of the driver and the passenger, the occupant detection unit 4 detects one of the occupants by the occupant detection processing to be described later, and when the detection target determining unit determines that the detection target is both the occupants of the driver and the passenger, the occupant detection unit 4 detects both the occupants by the occupant detection processing.

That is, when the detection target determining unit 3 determines that the detection target is one of the occupants, the detection region setting unit 5 of the occupant detection unit 4 sets the detection region to either the driver seat 31 or the seat where the passenger is present. Further, when the detection target determining unit 3 determines that the detection target is both the occupants, the detection region setting unit 5 sets the detection region to the driver seat 31 and the seat where the passenger is present. Then, the occupant detection processing described below is performed on the seat in which the detection region is set, and the occupant detection processing is not performed on the seat in which the detection region is not set, so that when the occupant detection processing is performed on one of the occupants, the processing load can be reduced as compared with a case where the occupant detection processing is performed on both the occupants.

Figure 4A:
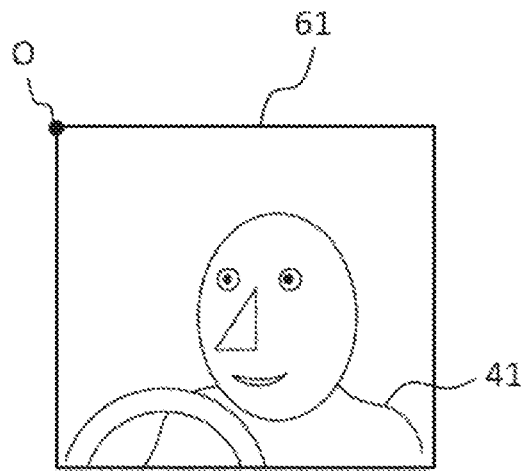
FIG. 4A and FIG. 4B are explanatory diagrams illustrating an occupant detection example of the occupant detection device according to the first embodiment.
Figure 4B:
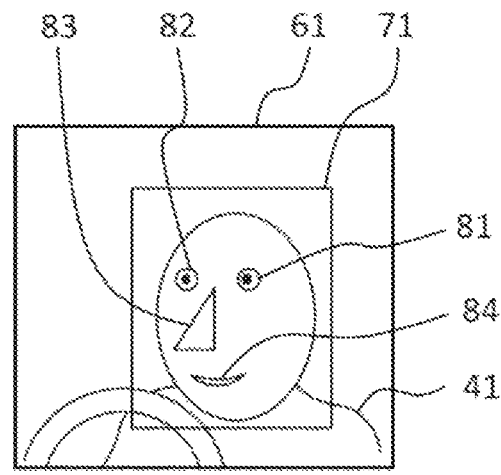

FIG. 4A and FIG. 4B are explanatory diagrams illustrating an occupant detection example of the occupant detection device 10 according to the first embodiment. FIG. 4A and FIG. 4B illustrate an example in which the occupant detection processing is performed on the driver 41. The face region detection unit 6 analyzes the captured image and detects the face region 71 that is a region where the face of the driver 41, that is, the face of the occupant is present in the detection region 61. First, the face region detection unit 6 extracts a region where the face of the occupant is present from the contrast ratio in the detection region 61, for example.

Then, the face region detection unit 6 sets a region of a rectangle or the like so as to include a region where the face of the occupant is present, and detects the region as the face region 71. Furthermore, the face region detection unit 6 obtains position information of the face region 71 and outputs the position information to a storage unit (not illustrated) of the occupant detection device 10. Here, for example, in a case where the face region 71 is rectangular, the position information of the face region 71 is coordinates of each vertex of the face region 71 with respect to a specific point (for example, a point O illustrated in FIG. 4A) in the detection region 61, and a width, a height, a size, and the like of the face region 71.

The feature point extraction processing of the feature information detection unit 7 will be described. The feature information detection unit 7 obtains the captured image from the image obtaining unit 1 and extracts face parts included in the face region. The feature information detection unit 7 extracts feature points regarding organs of the body of the occupant from the captured image obtained by the image obtaining unit 1, and detects feature information of the occupant. Various known algorithms can be used for the feature point extraction processing by the feature information detection unit 7, and a detailed description of these algorithms will be omitted. For example, when extracting feature points regarding the face of the occupant, the feature information detection unit 7 executes processing of extracting a plurality of feature points corresponding to each of a plurality of face parts (for example, a left eye 81, a right eye 82, a nose 83, a mouth 84, and the like).

For example, with respect to the left eye 81 and the right eye 82, the feature information detection unit 7 obtains position information in the captured image of feature points of the face parts such as outer corners of both eyes, inner corners of both eyes, upper eyelids, and lower eyelids. Further, for example, the feature information detection unit 7 obtains position information in the captured image of feature points of the face parts such as a nose root, a nose tip, a nose back, and nose wings regarding the nose 83. Furthermore, the feature information detection unit 7 obtains, for example, position information of feature points of the face parts such as an upper lip, a lower lip, and mouth corners in the captured image with respect to the mouth 84.

Note that the position information of the feature point of each face part obtained by the feature information detection unit 7 is information indicating coordinates having a specific position O in the detection region as a start point or coordinates having a specific position such as a center in the detection region as a start point, as illustrated in FIG. 4A. Further, the position information regarding the feature points extracted by the feature information detection unit 7 may be recorded in the storage unit of the occupant detection device 10.

Then, the feature information detection unit 7 calculates feature amounts of the occupant from the extracted feature points. Here, specifically, the feature amounts of the occupant are, for example, information indicating the state of the occupant, such as an eye opening degree and a mouth opening degree of the occupant, information indicating a positional relationship between feature points of the occupant, such as the distance between the left eye 81 and the right eye 82, the position of the nose 83 in the face of the occupant, and the like. In addition, various known algorithms can be used for the calculation of the feature amounts by the feature information detection unit 7. Note that the feature amount calculated by the feature information detection unit 7 may also be recorded in the storage unit of the occupant detection device 10. Hereinafter, the position information of the feature points extracted by the feature information detection unit 7 and the feature amounts calculated by the feature information detection unit 7 are collectively referred to as feature information.

Note that, although the example in which the occupant detection unit 4 extracts the face part of the occupant in the captured image and performs the occupant detection processing has been described, the above-described occupant detection processing is an example, and the occupant detection unit 4 may extract skeleton points such as joints of the occupant in the captured image and perform the occupant detection processing. When the occupant detection processing is performed using the skeleton points of the occupant in the captured image, it is sufficient if the feature information detection unit 7 extracts the skeleton points of the occupant in the detection region as feature points, and calculates the feature amounts such as a distance between joints or a shoulder width from the extracted feature points.

Even in a case where the occupant detection unit 4 extracts the skeleton points of the occupant in the captured image, when one of the occupants is the detection target, it is sufficient if the occupant detection unit 4 extracts the skeleton points of the occupant in the detection region set for the seat where one of the occupants is present, and when both the occupants are the detection target, it is sufficient if the occupant detection unit 4 extracts the skeleton points of the occupant in the detection region set for the driver seat 31 and the seat where the passenger is present.

Furthermore, the occupant detection device 10 may include an occupant authentication unit 11 and an attribute estimating unit 12, and may perform occupant authentication processing and attribute estimation processing using an occupant detection result. In this case, the occupant detection result by the occupant detection unit 4, such as the position information and the feature information of the face region of the occupant, is output to at least one of the occupant authentication unit 11 or the attribute estimating unit 12. The occupant authentication unit 11 authenticates the occupant detected by the occupant detection unit 4 using the occupant detection result of the occupant detection unit 4. For example, the occupant authentication unit 11 collates authentication data in which the feature information stored in the storage unit is associated with a specific individual with the feature information of the occupant detected by the occupant detection unit 4, and authenticates the occupant. Note that an authentication result by the occupant authentication unit 11 may be output to the vehicle-side control device 200. In addition, the occupant authentication processing by the occupant authentication unit 11 can use various known algorithms, and is not limited to the above-described example.

Further, by using the occupant detection result of the occupant detection unit 4, the attribute estimating unit 12 estimates attributes such as age information reflecting whether the occupant detected by the occupant detection unit 4 is an adult or an infant, gender, and seating position. The attribute estimating unit 12 estimates attributes such as age information, gender, and seating position of the occupant detected by the occupant detection unit 4 by using feature information such as the position and size of the face region of the occupant and the shoulder width of the occupant, for example. Further, the attribute estimation processing by the attribute estimating unit 12 can use various known algorithms, and is not limited to the above-described example.

Furthermore, the occupant detection device 10 may include a state estimating unit (not illustrated), and state estimation processing may be performed using the occupant detection result. In this case, the occupant detection result by the occupant detection unit 4 such as the position information and the feature information of the face region of the occupant is output to the state estimating unit. Then, the state estimating unit estimates the state of the occupant detected by the occupant detection unit 4 using the occupant detection result of the occupant detection unit 4. Here, the state of the occupant is, for example, a state of drowsiness of the occupant, a state of attention to driving, and the like. The state estimating unit estimates the state of the occupant using, for example, feature information such as the eye opening degree of the occupant and the line-of-sight direction of the occupant. In addition, the state estimation processing by the state estimating unit can use various known algorithms, and is not limited to the above-described example.

Note that the authentication result by the occupant authentication unit 11, an attribute estimation result by the attribute estimating unit 12, and a state estimation result by the state estimating unit may be output to the vehicle-side control device 200. For example, when a seat position adjustment unit (not illustrated) of the vehicle-side control device 200 adjusts the seat position by using the authentication result of the occupant authentication unit 11, the seat position can be adjusted to a position or the like preset for a specific individual. Further, for example, when the attribute estimation result of the attribute estimating unit 12 indicates that occupants in the vehicle includes an infant, it is possible to prevent the infant from being left behind by turning on an infant leaving behind notification function of a notification unit (not illustrated) of the vehicle-side control device 200, or the like. Furthermore, when the state estimation result of the occupant by the state estimating unit indicates that the occupant feels drowsy, the vehicle-side control device 200 may prevent the dozing driving by controlling the air conditioning device to eliminate the drowsiness, controlling the notification unit to issue a warning to the occupant, or the like.

Figure 5:
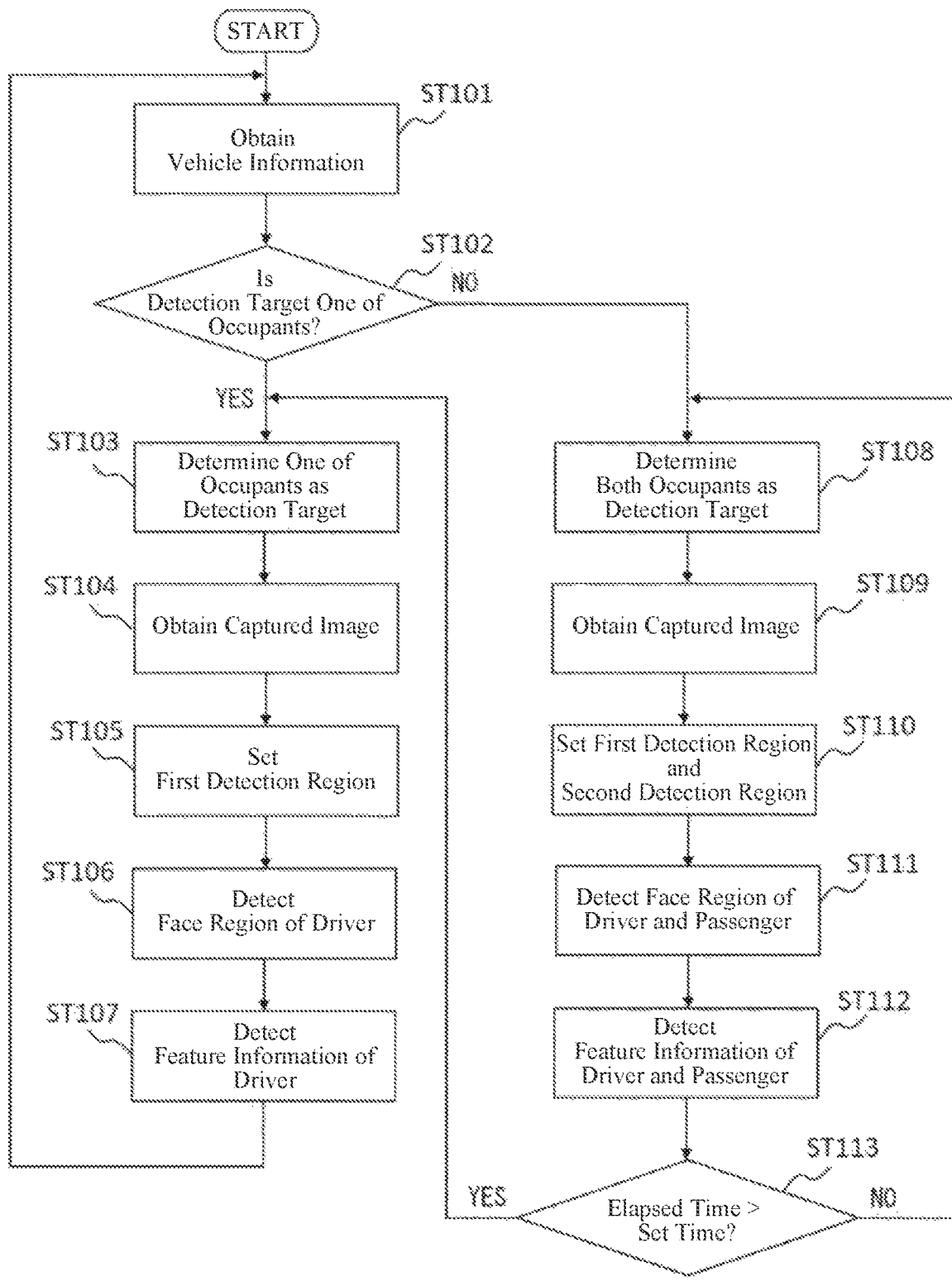
FIG. 5 is a flowchart illustrating an operation example of the occupant detection device according to the first embodiment.

Hereinafter, the operation of the occupant detection device 10 will be described. FIG. 5 is a flowchart illustrating an operation example of the occupant detection device 10 according to the first embodiment. For example, when the vehicle information obtaining unit 2 obtains a signal indicating that any door of the vehicle is opened and a signal indicating that the engine of the vehicle is started from the vehicle-side control device 200, the occupant detection device 10 starts the operation of the occupant detection processing. Further, although the flowchart of FIG. 5 does not illustrate processing for ending the operation of the occupant detection device 10, the occupant detection device 10 ends the operation of the occupant detection processing, for example, when the vehicle information obtaining unit 2 obtains a signal indicating that the engine of the vehicle is stopped from the vehicle-side control device 200.

First, after the operation of the occupant detection device 10 is started, the vehicle information obtaining unit 2 of the occupant detection device 10 obtains vehicle information from the vehicle-side control device 200 (ST101). Then, the detection target determining unit 3 determines whether the detection target of the occupant detection unit 4 is one of the occupants or both the occupants (ST102). In the example described below, one of the occupants is a driver, and both the occupants are a driver and a passenger. Furthermore, in the following description, an example will be described in which the detection target determining unit 3 determines whether the detection target of the occupant detection unit 4 is one of the occupants or both the occupants on the basis of whether or not the door of the passenger seat or the rear seat has been opened and closed.

First, the detection target determining unit 3 obtains vehicle information related to opening and closing of the door of the vehicle from the vehicle information obtaining unit 2, and checks whether or not the door of the passenger seat or the rear seat has been opened and closed. Then, when it is confirmed from the obtained vehicle information that the door of the passenger seat or the rear seat has not been opened or closed, the detection target determining unit 3 determines that the detection target of the occupant detection unit 4 is the driver (ST102; YES). Then, the detection target determining unit 3 outputs a determination result indicating that the detection target of the occupant detection unit 4 is the driver to the occupant detection unit 4, and determines one of the occupants, that is, the driver, as the detection target (ST103).

When the occupant detection unit 4 obtains the determination result indicating that the detection target is the driver from the detection target determining unit 3, the occupant detection unit 4 performs the occupant detection processing with the driver as the detection target. First, the image obtaining unit 1 obtains a captured image from the imaging device 20 (ST104). Then, the detection region setting unit 5 of the occupant detection unit 4 sets a detection region in a region corresponding to the driver seat in the captured image (ST105). Hereinafter, the region set in the region corresponding to the driver seat is referred to as a first detection region.

Then, the face region detection unit 6 of the occupant detection unit 4 detects, in the first detection region, a region where the face of the occupant is present, that is, a face region where the face of the driver is present (ST106). Furthermore, the feature information detection unit 7 of the occupant detection unit 4 performs feature information detection processing on the occupant whose face region is detected, that is, the driver, and detects feature information of the driver (ST107). Note that the feature information of the driver obtained by the feature information detection processing may be output to at least one of the occupant authentication unit 11, the attribute estimating unit 12, or the state estimating unit. Then, the operation of the occupant detection device 10 proceeds to processing of ST101.

On the other hand, when it is confirmed from the obtained vehicle information that the door of the passenger seat or the rear seat has been opened or closed, the detection target determining unit 3 determines that the detection target of the occupant detection unit 4 is the driver and the passenger (ST102; NO). Then, the detection target determining unit 3 outputs a determination result indicating that the detection target of the occupant detection unit 4 is the driver and the passenger to the occupant detection unit 4, and determines both the occupants, that is, the driver and the passenger as the detection targets (ST108).

When the occupant detection unit 4 obtains the determination result indicating that the detection target is the driver and the passenger from the detection target determining unit 3, the occupant detection unit 4 performs the occupant detection processing with the driver and the passenger as the detection targets. First, the image obtaining unit 1 obtains a captured image from the imaging device 20 (ST109). Then, the detection region setting unit 5 of the occupant detection unit 4 sets the first detection region in the captured image, and sets the detection region in a region corresponding to the seat where the passenger is present (ST110). Hereinafter, the detection region set in the region corresponding to the seat where the passenger is present is referred to as a second detection region.

Note that the second detection region may be set for each of the passenger seat and the rear seat. Further, in a case where the second detection region is set in the region corresponding to the seat where the passenger is present, it is sufficient if the second detection region is set in the region corresponding to the passenger seat when the door of the passenger seat is opened and closed. Similarly, it is sufficient if the second detection region is set in the region corresponding to the seat on the left side of the rear seat when the door on the left side of the rear seat is opened and closed, and it is sufficient if the second detection region is set in the region corresponding to the seat on the right side of the rear seat when the door on the right side of the rear seat is opened and closed. With respect to the region corresponding to the seat at the center of the rear seat, for example, it is sufficient if the second detection region is set when either the door on the left side of the rear seat or the door on the right side of the rear seat is opened or closed.

Then, the face region detection unit 6 of the occupant detection unit 4 detects a face region where the face of the occupant is present, that is, face regions where the faces of the driver and the passenger are each present in the set first detection region and second detection region (ST111). Furthermore, the feature information detection unit 7 of the occupant detection unit 4 performs the feature information detection processing on the occupant whose face region is detected, that is, the driver and the passenger, and detects feature information of the driver and the passenger (ST112). Note that the feature information of the driver and the passenger obtained by the feature information detection processing may be output to at least one of the occupant authentication unit 11, the attribute estimating unit 12, or the state estimating unit.

Next, the detection target determining unit 3 calculates an elapsed time (hereinafter referred to as an elapsed time) from determination that the detection target of the occupant detection unit 4 is the driver and the passenger, and determines whether or not the elapsed time exceeds a set time (ST113). If the elapsed time exceeds the set time (ST113; YES), the detection target determining unit 3 determines that the detection target of the occupant detection unit 4 is the driver, and the determination result is output to the occupant detection unit 4. Then, the operation of the occupant detection device 10 proceeds to processing of ST103.

On the other hand, when the elapsed time is equal to or less than the set time (ST113; NO), the detection target determining unit 3 determines that the detection target of the occupant detection unit 4 is the driver and the passenger, and the operation of the occupant detection device 10 proceeds to processing of ST108.

Note that the processing of ST101 to ST113 described above is repeated until the operation of the occupant detection device 10 is completed. Here, the detection target of the occupant detection unit 4 changes as needed depending on a determination result by the detection target determining unit 3 as to whether the detection target of the occupant detection unit 4 is one of the occupants or both the occupants. For example, when the detection target determining unit 3 determines that the detection target is the driver and the passenger in the processing of ST102, the occupant detection unit 4 detects the driver and the passenger in the processing of ST109 to ST112, and then the detection target determining unit 3 determines that the detection target is one of the occupants, that is, the driver in the processing of ST113, the occupant detection unit 4 detects the driver by excluding the passenger who is the other occupant different from the one of the occupants from the detection target in the processing of ST104 to ST107.

On the other hand, for example, when the detection target determining unit 3 determines that the detection target is the driver in the processing of ST102, the occupant detection unit 4 detects the driver in the processing of ST104 to ST107, and then the detection target determining unit 3 determines that the detection target is the driver and the passenger in the processing of ST102 again, the occupant detection unit 4 determines not only the driver who is one of the occupants but also the passenger who is the other of the occupants different from the one of the occupants as the detection target. As described above, since the detection target of the occupant detection unit 4 changes as needed, the processing load can be adjusted even when the occupant detection device 10 is operating.

In addition, in a case where the occupant detection unit 4 does not detect a passenger after determining that the detection target is both the occupants, that is, the driver and the passenger, the detection target may be determined as one of the occupants, that is, the driver. In this manner, it is possible to reduce the processing load by suppressing the occupant detection processing from being performed on the passenger even though the passenger is not present in the vehicle.

Figure 6A:
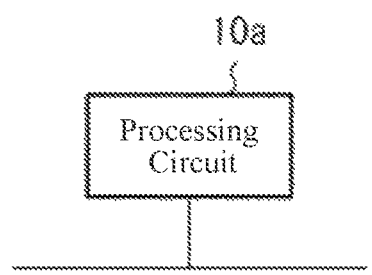
FIG. 6A and FIG. 6B are diagrams illustrating a hardware configuration example of the occupant detection device according to the first embodiment.
Figure 6B:
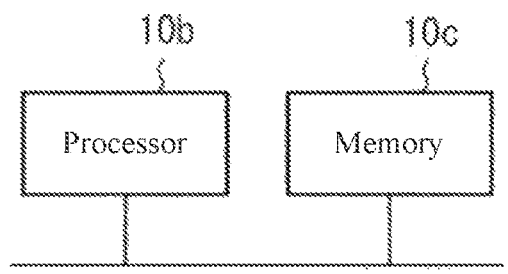

Next, a hardware configuration to implement the function of the occupant detection device 10 will be described. FIG. 6A and FIG. 6B are diagrams illustrating a hardware configuration example of the occupant detection device 10 according to the first embodiment. The functions of the image obtaining unit 1, the vehicle information obtaining unit 2, the detection target determining unit 3, the occupant detection unit 4, the detection region setting unit 5, the face region detection unit 6, the feature information detection unit 7, the occupant authentication unit 11, the attribute estimating unit 12, the state estimating unit, and the storage unit in the occupant detection device 10 are implemented by a processing circuit. That is, the image obtaining unit 1, the vehicle information obtaining unit 2, the detection target determining unit 3, the occupant detection unit 4, the detection region setting unit 5, the face region detection unit 6, the feature information detection unit 7, the occupant authentication unit 11, the attribute estimating unit 12, the state estimating unit, and the storage unit of the occupant detection device 10 may be a processing circuit 10a that is dedicated hardware as illustrated in FIG. 6A, or may be a processor 10b that executes a program stored in a memory 10c as illustrated in FIG. 6B.

As illustrated in FIG. 6A, when the image obtaining unit 1, the vehicle information obtaining unit 2, the detection target determining unit 3, the occupant detection unit 4, the detection region setting unit 5, the face region detection unit 6, the feature information detection unit 7, the occupant authentication unit 11, the attribute estimating unit 12, the state estimating unit, and the storage unit are dedicated hardware, the processing circuit 10a corresponds to, for example, a single circuit, a composite circuit, a programmed processor, a parallel-programmed processor, an application specific integrated circuit (ASIC), a field-programmable gate array (FPGA), or a combination thereof. The function of each of units of the image obtaining unit 1, the vehicle information obtaining unit 2, the detection target determining unit 3, the occupant detection unit 4, the detection region setting unit 5, the face region detection unit 6, the feature information detection unit 7, the occupant authentication unit 11, the attribute estimating unit 12, the state estimating unit, and the storage unit may be each implemented by processing circuits, or the function of each of the units may be collectively implemented by one processing circuit.

As illustrated in FIG. 6B, when the image obtaining unit 1, the vehicle information obtaining unit 2, the detection target determining unit 3, the occupant detection unit 4, the detection region setting unit 5, the face region detection unit 6, the feature information detection unit 7, the occupant authentication unit 11, the attribute estimating unit 12, the state estimating unit, and the storage unit are the processor 10b, the function of each of the units is implemented by software, firmware, or a combination of software and firmware. Software or firmware is described as a program and stored in the memory 10c. The processor 10b reads and executes the program stored in the memory 10c to implement each function of the image obtaining unit 1, the vehicle information obtaining unit 2, the detection target determining unit 3, the occupant detection unit 4, the detection region setting unit 5, the face region detection unit 6, the feature information detection unit 7, the occupant authentication unit 11, the attribute estimating unit 12, the state estimating unit, and the storage unit. That is, the image obtaining unit 1, the vehicle information obtaining unit 2, the detection target determining unit 3, the occupant detection unit 4, the detection region setting unit 5, the face region detection unit 6, the feature information detection unit 7, the occupant authentication unit 11, the attribute estimating unit 12, the state estimating unit, and the storage unit include the memory 10c for storing a program that results in execution of each step illustrated in FIG. 5 when executed by the processor 10b. In addition, it can also be said that these programs cause a computer to execute procedures or methods performed in the image obtaining unit 1, the vehicle information obtaining unit 2, the detection target determining unit 3, the occupant detection unit 4, the detection region setting unit 5, the face region detection unit 6, the feature information detection unit 7, the occupant authentication unit 11, the attribute estimating unit 12, the state estimating unit, and the storage unit.

Here, the processor 10b is, for example, a central processing unit (CPU), a processing device, an arithmetic device, a processor, a microprocessor, a microcomputer, a digital signal processor (DSP), or the like. The memory 10c may be, for example, a nonvolatile or volatile semiconductor memory such as a random access memory (RAM), a read only memory (ROM), a flash memory, an erasable programmable ROM (EPROM), or an electrically EPROM (EEPROM), a magnetic disk such as a hard disk or a flexible disk, or an optical disk such as a mini disk, a compact disc (CD), or a digital versatile disc (DVD).

Note that some of the respective functions of the image obtaining unit 1, the vehicle information obtaining unit 2, the detection target determining unit 3, the occupant detection unit 4, the detection region setting unit 5, the face region detection unit 6, the feature information detection unit 7, the occupant authentication unit 11, the attribute estimating unit 12, the state estimating unit, and the storage unit may be implemented by dedicated hardware, and some of the respective functions may be implemented by software or firmware. As described above, the processing circuit 10a in the occupant detection device 10 can implement the above-described functions by hardware, software, firmware, or a combination thereof. In addition, at least some of the functions of the image obtaining unit 1, the vehicle information obtaining unit 2, the detection target determining unit 3, the occupant detection unit 4, the detection region setting unit 5, the face region detection unit 6, the feature information detection unit 7, the occupant authentication unit 11, the attribute estimating unit 12, the state estimating unit, and the storage unit may be executed by an external server.

As described above, when the occupant detection device 10 includes the image obtaining unit 1 to obtain the captured image from the imaging device 20 including, in the imaging range, the driver present in the driver seat of the vehicle and the passenger present in the passenger seat or the rear seat, the occupant detection unit 4 to obtain the captured image from the image obtaining unit 1, the occupant detection unit being capable of detecting the driver and the passenger in the captured image, and the detection target determining unit 3 to determine whether the detection target of the occupant detection unit 4 is one of the occupants or both the occupants of the driver and the passenger, in which the occupant detection unit 4 detects one of the occupants when the detection target determining unit 3 determines that the detection target is the one of the occupants, and detects both the occupants when the detection target determining unit 3 determines that the detection target is both the occupants, so that the occupant detection device 10 that detects a driver and a passenger detects one of the driver and the passenger as necessary, and thus the processing load of the occupant detection processing can be reduced.

Note that, in the present embodiment, the operation example of the occupant detection device 10 has been described with an example in which the occupant detection device 10 detects the face region of the occupant in the processing of ST106 and ST111, but when the feature information detection unit 7 does not perform the processing of extracting the face parts of the occupant, the processing of ST106 and ST111 can be omitted.

Furthermore, in the present embodiment, an example has been described in which the detection target determining unit 3 determines that the detection target of the occupant detection unit 4 is both occupants, that is, the driver and the passenger when the passenger gets in the vehicle, and determines that the detection target of the occupant detection unit 4 is one of the occupants, that is, the driver when the set time has elapsed since the passenger gets in the vehicle, but the determination example of the detection target determining unit 3 is not limited to the above example. When the passenger gets in the vehicle, at least the driver gets in the vehicle. Therefore, the detection target determining unit 3 may determine that the detection target of the occupant detection unit 4 is both the occupants when a signal indicating that the driver gets in the vehicle is obtained from the vehicle-side control device 200. That is, the detection target determining unit 3 may determine that the detection target of the occupant detection unit 4 is both occupants, that is, the driver and the passenger when the driver gets in the vehicle, and may determine that the detection target of the occupant detection unit 4 is one of the occupants, that is, the driver when the set time has elapsed since the driver gets in the vehicle.

Furthermore, the detection target determining unit 3 may determine that the detection target of the occupant detection unit 4 is both occupants when the occupant gets in the vehicle, and may determine that the detection target of the occupant detection unit 4 is one of the occupants, that is, the driver when a signal indicating that the authentication processing for the passenger is performed by the occupant authentication unit 11 is obtained. In addition, the detection target determining unit 3 may determine that the detection target of the occupant detection unit 4 is both occupants in a case where the occupants get in the vehicle, and may determine that the detection target of the occupant detection unit 4 is one of the occupants, that is, the driver when the signal indicating that the attribute estimation processing of the passenger is performed by the attribute estimating unit 12 is obtained. Furthermore, when the occupants get in the vehicle, the detection target determining unit 3 may determine that the detection target of the occupant detection unit 4 is both the occupants, and when obtaining a signal indicating that the state estimation processing of the passenger by the state estimating unit has been performed, the detection target determining unit 3 may determine that the detection target of the occupant detection unit 4 is one of the occupants, that is, the driver.

For example, when the attribute estimating unit 12 estimates an attribute of the passenger and adjusts the seat position suitable for the physique or the like of the passenger using the estimation result, it is not necessary to always perform the attribute estimation processing for the passenger as long as the attribute estimation processing of the passenger succeeds once. Therefore, after the authentication processing, the attribute estimation processing, or the state estimation processing of the passenger is performed, if the detection target of the occupant detection unit 4 is determined as one of the occupants, that is, the driver, the processing load can be reduced as compared with a case where the authentication processing, the attribute estimation processing, or the state estimation processing of the passenger is constantly performed.

In addition, in the present embodiment, after both the occupants get in the vehicle and the occupant detection unit 4 detects both the occupants, if one of the driver and the passenger gets off the vehicle, the detection target determining unit 3 may determine that the detection target of the occupant detection unit 4 is the other of the occupants of the driver and the passenger. For example, when the detection target determining unit 3 obtains, from the vehicle-side control device 200, a signal indicating that the door corresponding to the driver seat has been opened or closed in the vehicle in which the driver and the passenger have got in, it is sufficient if the occupant detection unit 4 determines that the detection target is the passenger. In this manner, it is possible to suppress the occupant detection processing from being performed on both the occupants even though the occupant present in the vehicle is only one of the driver and the passenger, and the processing load of the occupant detection processing can be reduced.

Second Embodiment

As in the first embodiment, an occupant detection device 10 according to a second embodiment includes the image obtaining unit 1 that obtains a captured image, the occupant detection unit 4 that can detect a driver and a passenger in the captured image, and the detection target determining unit 3 that determines whether the detection target of the occupant detection unit 4 is one of the occupants of the driver and the passenger or both the occupants of the driver and the passenger. The present embodiment is different from the first embodiment in that one of the occupants is the detection target when the vehicle is traveling, and both the occupants are the detection target when the vehicle is stopped. The same components as those in the first embodiment are denoted by the same reference numerals, and the description thereof will be omitted.

At the time of traveling of the vehicle, it is necessary to immediately detect a change in the state of the driver in order to implement travel support functions such as prevention of dozing driving and a vehicle evacuation process in an emergency. Therefore, at the time of traveling of the vehicle, it is required to allocate a processing cost to the detection processing of the driver. Accordingly, the detection target determining unit 3 of the present embodiment determines that the detection target of the occupant detection unit 4 is one of the occupants, that is, the driver when the vehicle is traveling, and determines that the detection target of the occupant detection unit 4 is both the occupants, that is, the driver and the passenger when the vehicle is stopped.

The detection target determining unit 3 obtains travel information regarding a travel situation of the vehicle from the vehicle information obtaining unit 2, and determines whether the detection target of the occupant detection unit 4 is one of the occupants or both the occupants by using the travel information. Here, the travel information regarding the travel situation of the vehicle obtained by the detection target determining unit 3 is, for example, the position of the shift lever, the vehicle speed, the guidance information from the navigation device, and the like among the vehicle information obtained by the vehicle information obtaining unit 2 from the vehicle-side control device 200. For example, when the shift lever is at the drive position, when the vehicle speed exceeds a set threshold value (for example, 0 km/h), and when the navigation device is guiding a road to a destination, the detection target determining unit 3 determines that the vehicle is traveling, and determines that the detection target of the occupant detection unit 4 is the driver. On the other hand, for example, when the shift lever is at the parking position, when the vehicle speed is equal to or less than the set threshold value (for example, 0 km/h), and when the navigation device ends the guidance, the detection target determining unit 3 determines that the vehicle is stopped, and determines that the detection target of the occupant detection unit 4 is the driver and the passenger.

Incidentally, in a case where, for example, a driver suddenly loses consciousness in a vehicle capable of automated driving and a vehicle evacuation process in an emergency is performed, if the vehicle is in automated driving, there is a low possibility that the vehicle becomes inoperable immediately. Therefore, when the vehicle is in automated driving, it does not lead to a serious accident even if a change in the state of the driver is not immediately detected. In addition, if various functions such as detection of a passenger in addition to a driver during automated driving and adjustment of a seat position suitable for the occupant's physique or the like are implemented, a comfortable vehicle interior environment can be provided. On the other hand, during manual driving, if the driver suddenly loses consciousness or the like, there is a high possibility that the driver cannot control the driving of the vehicle. Therefore, in order to implement the travel support functions such as a vehicle evacuation process in an emergency in order to prevent occurrence of an accident, it is necessary to immediately detect a change in the state of the driver, and it is preferable to reduce the processing load of the occupant detection processing during manual driving.

Therefore, the detection target determining unit 3 may obtain, from the vehicle information obtaining unit 2, information indicating whether the vehicle is in automated driving or manual driving as the travel information regarding the travel state of the vehicle, and determine whether the detection target of the occupant detection unit 4 is one of the occupants or both the occupants. In this case, when obtaining the travel information indicating that the vehicle is in manual driving from the vehicle information obtaining unit 2, it is sufficient if the detection target determining unit 3 determines that the detection target of the occupant detection unit 4 is one of the occupants, that is, the driver, and when obtaining the travel information indicating that the vehicle is in automated driving, it is sufficient if the detection target determining unit 3 determines that the detection target of the occupant detection unit 4 is both the occupants, that is, the driver and the passenger. In this manner, as described above, the processing load of the occupant detection processing can be reduced during manual driving in which the change in the state of the driver needs to be immediately detected.

Figure 7:
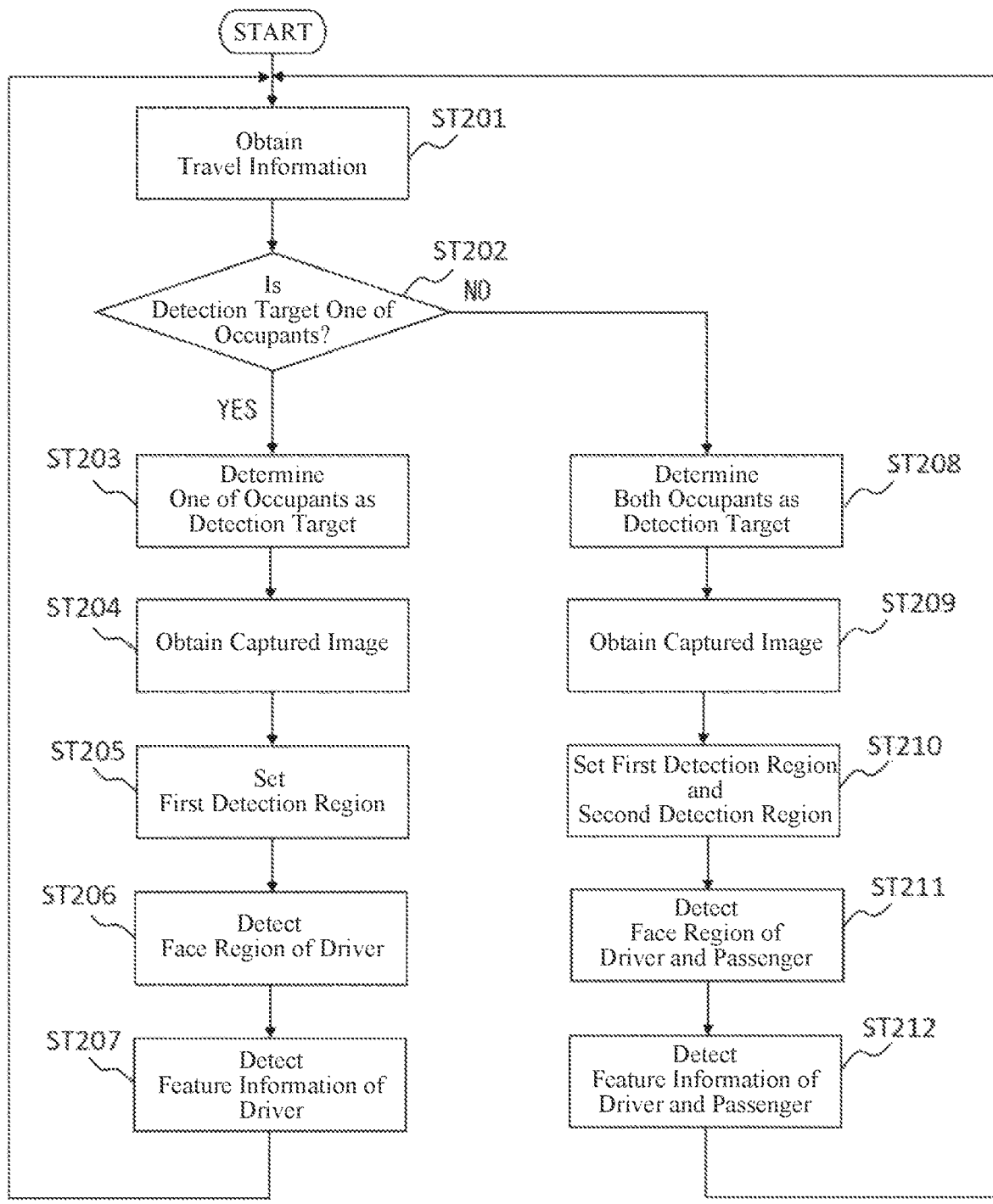
FIG. 7 is a flowchart illustrating an operation example of an occupant detection device according to a second embodiment.

Then, the occupant detection unit 4 detects the driver or detects the driver and the passenger using the determination result by the detection target determining unit 3. Next, the operation of the occupant detection device 10 will be described. FIG. 7 is a flowchart illustrating an operation example of the occupant detection device 10 according to the second embodiment. For example, when the vehicle information obtaining unit 2 obtains a signal indicating that any door of the vehicle is opened and a signal indicating that the engine of the vehicle is started from the vehicle-side control device 200, the occupant detection device 10 starts the operation of the occupant detection processing. In addition, although the flowchart of FIG. 7 does not illustrate processing for ending the operation of the occupant detection device 10, the occupant detection device 10 ends the operation of the occupant detection processing, for example, when the vehicle information obtaining unit 2 obtains a signal indicating that the engine of the vehicle is stopped from the vehicle-side control device 200.

First, after the operation of the occupant detection device 10 is started, the vehicle information obtaining unit 2 of the occupant detection device 10 obtains travel information from the vehicle-side control device 200 (ST201). Then, the detection target determining unit 3 determines whether the detection target of the occupant detection unit 4 is the driver or the driver and the passenger by using the travel information (ST202).

The detection target determining unit 3 obtains the travel information regarding the travel situation of the vehicle from the vehicle information obtaining unit 2, and checks whether or not the vehicle is traveling (ST102). For example, when the travel information indicates that the vehicle speed exceeds 0 km/h, the detection target determining unit 3 determines that the vehicle is traveling, and when the travel information indicates that the vehicle speed is 0 km/h, the detection target determining unit 3 determines that the vehicle is stopped. When it is confirmed from the travel information that the vehicle is traveling, the detection target determining unit 3 determines that the detection target of the occupant detection unit 4 is the driver (ST202; YES). Then, the detection target determining unit 3 outputs a determination result indicating that the detection target of the occupant detection unit 4 is the driver to the occupant detection unit 4, and determines one of the occupants, that is, the driver, as the detection target (ST203).

When the occupant detection unit 4 obtains the determination result indicating that the detection target is the driver from the detection target determining unit 3, the occupant detection unit 4 performs the occupant detection processing with the driver as the detection target. First, the image obtaining unit 1 obtains a captured image from the imaging device 20 (ST204). Then, the detection region setting unit 5 of the occupant detection unit 4 sets the first detection region in the captured image (ST205). Next, the face region detection unit 6 of the occupant detection unit 4 detects, in the first detection region, a region where the face of the occupant is present, that is, a face region where the face of the driver is present (ST206). Furthermore, the feature information detection unit 7 of the occupant detection unit 4 performs the feature information detection processing on the occupant whose face region is detected, that is, the driver, and detects feature information of the driver (ST207). Note that the feature information of the driver obtained by the feature information detection processing may be output to at least one of the occupant authentication unit 11, the attribute estimating unit 12, or the state estimating unit. Then, the operation of the occupant detection device 10 proceeds to processing of ST201.

On the other hand, when it is confirmed from the vehicle information that the vehicle is stopped, the detection target determining unit 3 determines that the detection target of the occupant detection unit 4 is the driver and the passenger (ST202; NO). Then, the detection target determining unit 3 outputs a determination result indicating that the detection target of the occupant detection unit 4 is the driver and the passenger to the occupant detection unit 4, and determines both the occupants, that is, the driver and the passenger as the detection targets (ST208).

When the occupant detection unit 4 obtains the determination result indicating that the detection target is the driver and the passenger from the detection target determining unit 3, the occupant detection unit 4 performs the occupant detection processing with the driver and the passenger as the detection targets. First, the image obtaining unit 1 obtains a captured image from the imaging device 20 (ST209). Then, the detection region setting unit 5 of the occupant detection unit 4 sets the first detection region and the second detection region in the captured image (ST210).

Then, the face region detection unit 6 of the occupant detection unit 4 detects a region where the face of the occupant is present, that is, face regions where the faces of the driver and the passenger are each present in the set first detection region and second detection region (ST211). Furthermore, the feature information detection unit 7 of the occupant detection unit 4 performs the feature information detection processing on the occupant whose face region is detected, that is, the driver and the passenger, and detects feature information of the driver and the passenger (ST212). Then, the operation of the occupant detection device 10 proceeds to processing of ST201. Note that the feature information of the driver and the passenger obtained by the feature information detection processing may be output to at least one of the occupant authentication unit 11, the attribute estimating unit 12, or the state estimating unit.

Note that the processing of ST201 to ST212 described above is repeated until the operation of the occupant detection device 10 is completed. Here, the detection target of the occupant detection unit 4 changes as needed depending on a determination result by the detection target determining unit 3 as to whether the detection target of the occupant detection unit 4 is one of the occupants or both the occupants. For example, when the detection target determining unit 3 determines that the detection target is the driver and the passenger in the processing of ST202, the occupant detection unit 4 detects the driver and the passenger in the processing of ST209 to ST212, and then the detection target determining unit 3 determines that the detection target is one of the occupants, that is, the driver in the processing of ST211, the occupant detection unit 4 detects the driver by excluding the passenger who is the other of the occupants different from the one of the occupants from the detection target in the processing of ST204 to ST207.

On the other hand, for example, when the detection target determining unit 3 determines that the detection target is the driver in the processing of ST202, the occupant detection unit 4 detects the driver in the processing of ST204 to ST207, and then the detection target determining unit 3 determines that the detection target is the driver and the passenger in the processing of ST202 again, the occupant detection unit 4 determines not only the driver who is one of the occupants but also the passenger who is the other of the occupants different from the one of the occupants as the detection target. As described above, since the detection target of the occupant detection unit 4 changes as needed, the processing load can be adjusted even when the occupant detection device 10 is operating.

In addition, in a case where the occupant detection unit 4 does not detect a passenger after determining that the detection target is both the occupants, that is, the driver and the passenger, the detection target may be determined as one of the occupants, that is, the driver. In this manner, it is possible to reduce the processing load by suppressing the occupant detection processing from being performed on the passenger even though the passenger is not present in the vehicle.

As described above, with respect to the occupant detection device 10 in which the driver and the passenger are the detection targets, since one of the occupants of the driver and the passenger, that is, the driver is determined as the detection target by the occupant detection unit 4 at the time of traveling of the vehicle, which has a large influence on safety during driving, it is possible to reduce the processing load of the occupant detection processing.

Note that, in the present embodiment, the operation example of the occupant detection device 10 has been described with an example in which the occupant detection device 10 detects the face region of the occupant in the processing of ST206 and ST211, but when the feature information detection unit 7 does not perform the processing of extracting the face parts of the occupant, the processing of ST206 and ST211 can be omitted.

Further, in the present embodiment, with respect to the occupant detection device 10 in which the driver and the passenger are the detection targets, an example in which the driver out of the driver and the passenger is the detection target of the occupant detection unit 4 at the time of traveling of the vehicle, which has a large influence on safety during driving, has been described using the operation example, but the operation example of the occupant detection device 10 is not limited to the above-described example. For example, the occupant detection device 10 may determine both the occupants of the driver and the passenger as the detection targets of the occupant detection unit 4 when the vehicle is traveling, and may determine the passenger who is one of the occupants of the driver and the passenger as the detection target of the occupant detection unit 4 when the vehicle is stopped. In this manner, for example, in a case where a process that requires a large processing cost is performed, such as a case where the authentication processing is performed on the passenger, the process that requires a large processing cost can be completed when the vehicle is stopped, which has a small influence on safety during driving, and thus the processing load of the occupant detection processing can be reduced.

Note that, in the present embodiment, an example has been described in which the detection target determining unit 3 determines that the detection target of the occupant detection unit 4 is both the occupants when the travel information indicating that the vehicle is in automated driving is obtained from the vehicle information obtaining unit 2, and determines that the detection target of the occupant detection unit 4 is one of the occupants, that is, the driver when the travel information indicating that the vehicle is in manual driving is obtained, but it is not limited to the above example. For example, the detection target determining unit 3 may obtain the automated driving level as the travel information from the vehicle information obtaining unit 2, and determine whether the detection target of the occupant detection unit 4 is both the occupants or one of the occupants by using the automated driving level. In this case, when the automated driving level is equal to or higher than a set threshold value, it is sufficient if the detection target determining unit 3 determines that the vehicle is in automated driving, and determines that the detection target of the occupant detection unit 4 is both the occupants. On the other hand, when the automated driving level is less than the set threshold value, it is sufficient if the detection target determining unit 3 determines that the vehicle is in manual driving and determines that the detection target of the occupant detection unit 4 is one of the occupants, that is, the driver. As described above, the state of being in automated driving is not limited to the case where the automated driving is fully performed. Further, "during the manual driving" is not limited to a case where the manual driving is fully performed.

In addition, in the present embodiment, as in the first embodiment, the occupant detection device 10 may perform the occupant detection processing with the driver and the passenger as the detection targets when the driver or the passenger gets in the vehicle, and may perform the occupant detection processing with the driver as the detection target when the set time has elapsed since the driver or the passenger gets in the vehicle, or the like. For example, the processing operation in the occupant detection device 10 may be a combination of the processing of ST101 to ST113 described with reference to FIG. 5 and the processing of ST201 to ST212 described with reference to FIG. 7. In this case, which of the determination results of ST102 and ST202 is prioritized may be determined in any manner, and for example, when the determination results of ST102 and ST202 match, the determination result of the detection target determining unit 3 may be output to the occupant detection unit 4.

Third Embodiment

As in the first embodiment, an occupant detection device 90 according to a third embodiment includes the image obtaining unit 1 that obtains a captured image, the occupant detection unit 4 that can detect a driver and a passenger in the captured image, and the detection target determining unit 8 that determines whether the detection target of the occupant detection unit 4 is one of the occupants of the driver and the passenger or both the occupants of the driver and the passenger. The present embodiment is different from the first embodiment in that one of the occupants, that is, the driver is the detection target when the state of the driver is not normal, and both the occupants, that is, the driver and the passenger are the detection targets when the state of the driver is normal. The same components as those in the first embodiment are denoted by the same reference numerals, and the description thereof will be omitted.

As described in the second embodiment, it is necessary to detect the state of the driver in order to implement travel support functions such as prevention of dozing driving and the vehicle evacuation process in an emergency. Notification of a warning for preventing dozing driving and the vehicle evacuation process in an emergency are not executed when the state of the driver is normal, and thus, in such a case, there is no problem even if the processing load is high, and it is preferable to detect a passenger and perform control of the seat position, air conditioning control, and the like for the passenger. On the other hand, when the state of the driver is not normal, it is necessary to reduce the processing load of the occupant detection device 90 in some cases in order to detect the change in the state of the driver immediately.

Therefore, the detection target determining unit 8 of the present embodiment determines that the detection target of the occupant detection unit 4 is one of the occupants, that is, the driver when the state of the driver is not normal, and determines that the detection target of the occupant detection unit 4 is both the occupants, that is, the driver and the passenger when the state of the driver is normal.

Figure 8:
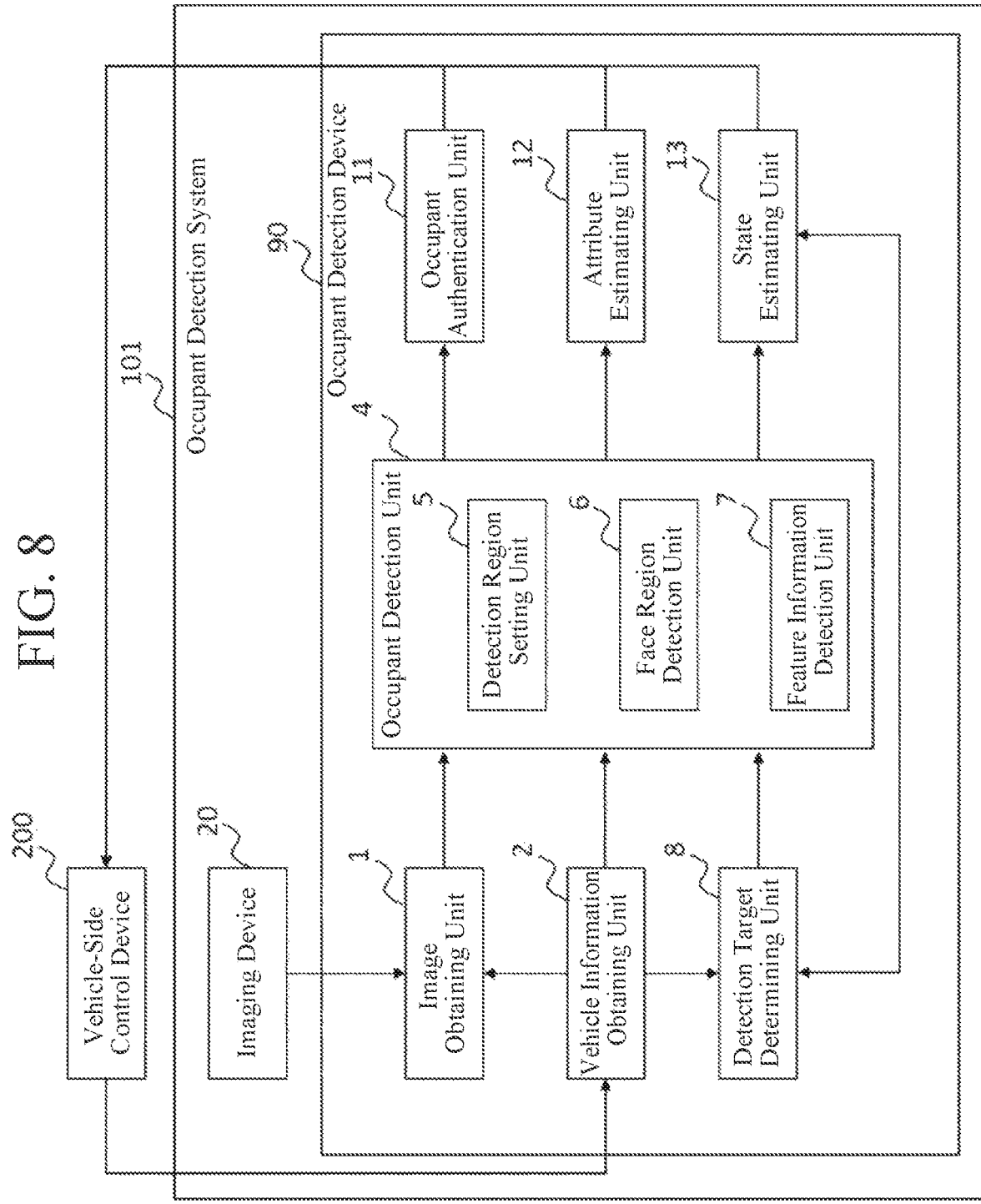
FIG. 8 is a block diagram illustrating a configuration example of an occupant detection system according to a third embodiment.

FIG. 8 is a block diagram illustrating a configuration example of the occupant detection system 101 according to the third embodiment. As illustrated in FIG. 8, the occupant detection device 90 includes a state estimating unit 13 that estimates a state of an occupant. Further, the detection target determining unit 8 is connected to the state estimating unit 13, and determines whether the detection target of the occupant detection unit 4 is one of the occupants or both the occupants by using a state estimation result of the occupant by the state estimating unit 13.

First, the state estimating unit 13 will be described. The state estimating unit 13 is connected to the occupant detection unit 4, and estimates the state of the occupant using the feature information detected by the feature information detection unit 7 of the occupant detection unit 4. The state of the occupant is, for example, a state related to drowsiness of the occupant, a state related to attention of the occupant to driving, a state related to physical condition of the occupant, and the like. Then, the state estimating unit 13 estimates an index value of the state related to drowsiness of the occupant, an index value of the state related to attention of the occupant to driving, and an index value of the state related to physical condition of the occupant, that is, the wakefulness level, the attention level, and the health level.

When estimating the awakening degree of the occupant, the state estimating unit 13 obtains the feature information of the occupant from the occupant detection unit 4, and calculates the wakefulness level of the occupant using, for example, the distance between the upper eyelid and the lower eyelid, that is, the eye opening degree. For example, the state estimating unit 13 estimates the wakefulness level of the occupant to be lower as the eye opening degree becomes smaller. Further, the state estimating unit 13 may estimate that the wakefulness level of the occupant is low when the blinking frequency of the occupant is low.

Further, when calculating the attention level of the occupant, the state estimating unit 13 obtains the feature information of the occupant from the occupant detection unit 4, and calculates the attention level of the occupant using, for example, the line-of-sight direction of the occupant. For example, the state estimating unit 13 estimates the attention level of the occupant to be low as the line-of-sight direction of the occupant calculated from the face direction of the occupant, the position of the pupil, and the like deviates from a normal viewing range with respect to the traveling direction of the vehicle, such as forward of the vehicle.

Furthermore, when estimating the health level of the occupant, the state estimating unit 13 obtains the feature information of the occupant from the occupant detection unit 4, and estimates the health level of the occupant using, for example, the face direction of the occupant, the size of the face region of the occupant, and the like. For example, the state estimating unit 13 estimates the health level of the occupant to be low as the posture of the occupant becomes abnormal due to the occupant looking down or falling down.

Note that the above-described processing of estimating the state of the occupant by the state estimating unit 13 is an example, and various known algorithms can be used for the process of estimating the state of the occupant. In addition, the state estimating unit 13 may not estimate all of the wakefulness level, the attention level, and the health level, but is only required to estimate at least one of the wakefulness level, the attention level, and the health level.

Then, the detection target determining unit 8 is connected to the state estimating unit 13, and determines whether the detection target of the occupant detection unit 4 is one of the occupants, that is, the driver, or both the occupants, that is, the driver and the passenger, using the state estimation result of the occupant by the state estimating unit 13. The detection target determining unit 8 obtains at least one of the wakefulness level, the attention level, and the health level as the state estimation result from the state estimating unit 13, and confirms whether or not the state of the occupant is normal. Here, the state of the occupant being normal refers to a case where the wakefulness level, the attention level, or the health level obtained from the state estimating unit 13 is equal to or more than a set threshold value, and the state of the occupant being not normal refers to a case where the wakefulness level, the attention level, or the health level obtained from the state estimating unit 13 is less than the set threshold value.

Note that the state of the occupant being not normal includes not only a case where an abnormality has already occurred in the occupant, such as a case where the occupant falls asleep, but also a case where an abnormality may occur in the occupant, such as a case where the occupant feels drowsy. Furthermore, the threshold values set for the wakefulness level, the attention level, and the health level are not necessarily the same among the wakefulness level, the attention level, and the health level, and may be different among the wakefulness level, the attention level, and the health level.

For example, when at least one of the wakefulness level, the attention level, and the health level obtained from the state estimating unit 13 is less than a set threshold value, the detection target determining unit 8 determines that the state of the occupant is not normal, and determines that the detection target of the occupant detection unit 4 is the driver. On the other hand, for example, when all of the wakefulness level, the attention level, and the health level obtained from the state estimating unit 13 are equal to or more than the set threshold value, the detection target determining unit 8 determines that the state of the occupant is normal and that the detection target of the occupant detection unit 4 is the driver and the passenger. Note that the determination as to whether or not the state of the occupant is normal by the detection target determining unit 8 is not limited to whether or not all of the wakefulness level, the attention level, and the health level are equal to or more than the set threshold value, and may be made based on whether or not an index value comprehensively estimated using the wakefulness level, the attention level, and the health level is equal to or more than the set threshold value.

Figure 9:
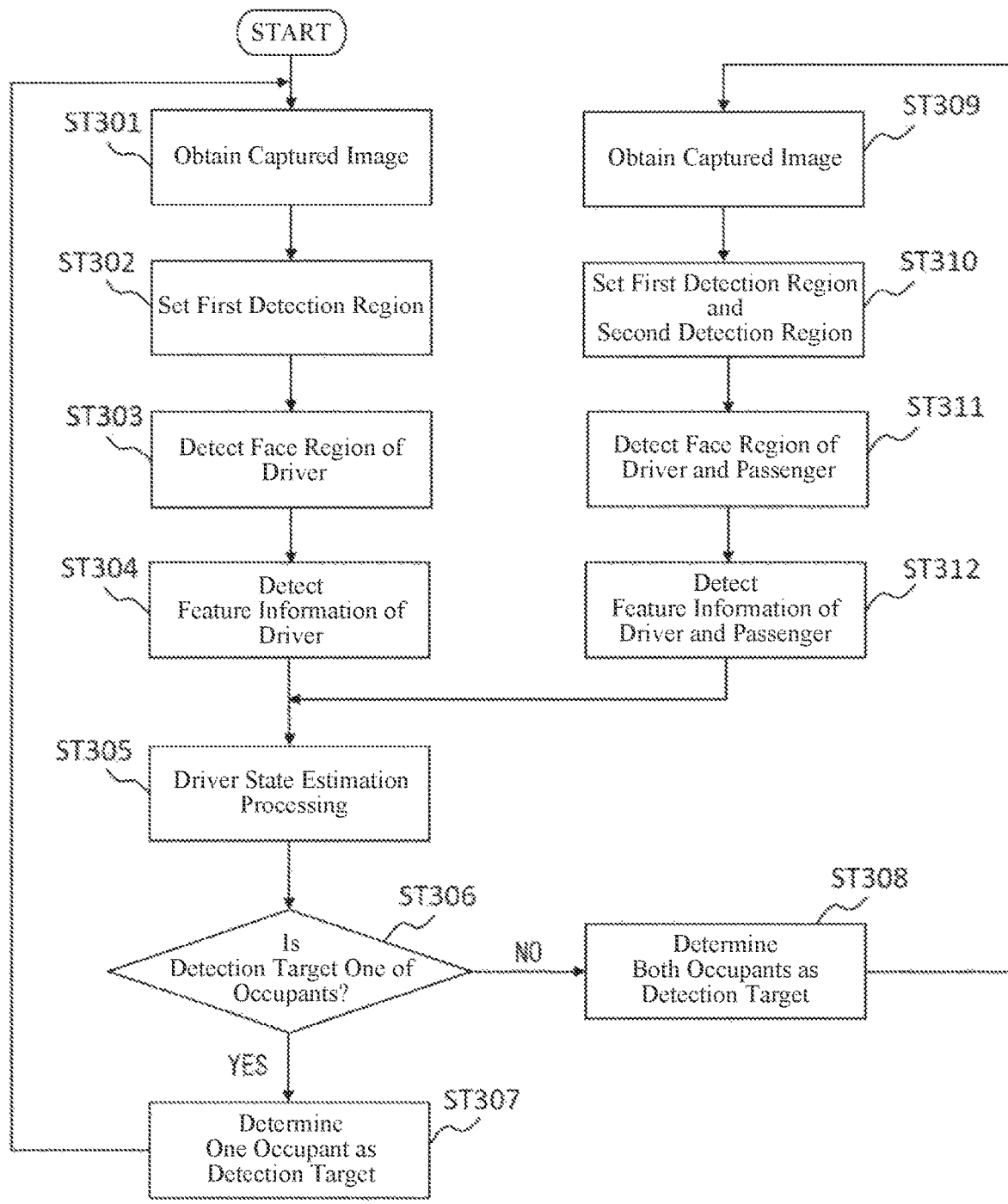
FIG. 9 is a flowchart illustrating an operation example of an occupant detection device according to the third embodiment.

Then, the occupant detection unit 4 detects the driver or the driver and the passenger by using the determination result of the detection target determining unit 8. Next, the operation of the occupant detection device 90 will be described. FIG. 9 is a flowchart illustrating an operation example of the occupant detection device 90 according to the third embodiment. For example, when the vehicle information obtaining unit 2 obtains a signal indicating that any door of the vehicle is opened and a signal indicating that the engine of the vehicle is started from the vehicle-side control device 200, the occupant detection device 90 starts the operation of the occupant detection processing. Further, although the flowchart of FIG. 9 does not illustrate processing for ending the operation of the occupant detection device 90, the occupant detection device 90 ends the operation of the occupant detection processing, for example, when the vehicle information obtaining unit 2 obtains a signal indicating that the engine of the vehicle is stopped from the vehicle-side control device 200.

First, after the operation of the occupant detection device 90 is started, the image obtaining unit 1 obtains a captured image from the imaging device 20 (ST301). Then, the detection region setting unit 5 of the occupant detection unit 4 sets a first detection region in the captured image (ST302). Then, the face region detection unit 6 of the occupant detection unit 4 detects a face region where the face of the occupant is present, that is, a face region where the face of the driver is present in the set first detection region (ST303). Furthermore, the feature information detection unit 7 of the occupant detection unit 4 performs the feature information detection processing on the occupant whose face region is detected, that is, the driver, and detects feature information of the driver (ST304). Note that the feature information of the driver obtained by the feature information detection processing may be output to at least one of the occupant authentication unit 11 and the attribute estimating unit 12. Then, the operation of the occupant detection device 90 proceeds to processing of ST305.

Next, the state estimating unit 13 of the occupant detection device 90 obtains the feature information of the driver from the feature information detection unit 7, and performs driver state estimation processing (ST305). The driver state estimation processing by the state estimating unit 13 is a process of estimating the wakefulness level, the attention level, and the health level of the driver using the feature information, for example. In the following description, an example will be described in which the state estimating unit 13 estimates the wakefulness level of the driver, and the detection target determining unit 8 determines whether the detection target of the occupant detection unit 4 is one of the occupants, that is, the driver, or both the occupants, that is, the driver and the passenger, using the wakefulness level of the driver.

First, the detection target determining unit 8 obtains a state estimation result from the state estimating unit 13. Then, the detection target determining unit 8 checks whether or not the driver is normal from the state estimation result, and determines whether the detection target of the occupant detection unit 4 is one of the occupants or both the occupants (ST306). For example, the detection target determining unit 8 obtains the wakefulness level of the driver from the state estimating unit 13 as the state estimation result, and determines that the state of the driver is normal when the wakefulness level is equal to or more than a set threshold value. On the other hand, if the wakefulness level of the driver is less than the set threshold value, the detection target determining unit 8 determines that the state of the driver is not normal.

When it is confirmed from the state estimation result that the driver is not normal, the detection target determining unit 8 determines that the detection target of the occupant detection unit 4 is one of the occupants, that is, the driver (ST306; YES). Then, the detection target determining unit 8 outputs a determination result indicating that the detection target is the driver to the occupant detection unit 4, and determines one of the occupants, that is, the driver, as the detection target (ST307).

When the occupant detection unit 4 obtains the determination result indicating that the detection target is the driver from the detection target determining unit 8, the process proceeds to ST301, and as described above, the occupant detection unit 4 performs the occupant detection processing with the driver as the detection target in the processing of ST301 to ST304. That is, the image obtaining unit 1 obtains a captured image from the imaging device 20 (ST301). Next, the detection region setting unit 5 sets a first detection region in the captured image (ST302). Then, the face region detection unit 6 of the occupant detection unit 4 detects a face region where the driver's face is present in the detection region (ST303). Furthermore, the feature information detection unit 7 of the occupant detection unit 4 performs the feature information detection processing on the driver and detects feature information of the driver (ST304).

On the other hand, when it is confirmed from the state estimation result that the driver is normal, the detection target determining unit 8 determines that the detection target of the occupant detection unit 4 is both the occupants, that is, the driver and the passenger (ST306; NO). Then, the detection target determining unit 8 outputs a determination result indicating that the detection target is the driver and the passenger to the occupant detection unit 4, and determines both the occupants, that is, the driver and the passenger as the detection targets (ST308).

When the occupant detection unit 4 obtains the determination result indicating that the detection target is the driver and the passenger from the detection target determining unit 8, the occupant detection unit 4 performs the occupant detection processing with the driver and the passenger as the detection targets. First, the image obtaining unit 1 obtains a captured image from the imaging device 20 (ST309), and the detection region setting unit 5 of the occupant detection unit 4 sets the first detection region and the second detection region in the captured image (ST310).

Next, the face region detection unit 6 of the occupant detection unit 4 detects a face region where the face of the occupant is present, that is, face regions where the faces of the driver and the passenger are each present in the set first detection region and second detection region (ST311). Furthermore, the feature information detection unit 7 of the occupant detection unit 4 performs the feature information detection processing on the occupant whose face region is detected, that is, the driver and the passenger, and detects feature information of the driver and the passenger (ST312). Note that the feature information of the driver and the passenger obtained by the feature information detection processing may be output to at least one of the occupant authentication unit 11, the attribute estimating unit 12, or the state estimating unit 13.

Then, the operation of the occupant detection device 90 proceeds to processing of ST305, and performs the state estimation processing of the driver. Further, when the feature information of the driver and the passenger is detected in the processing of ST309 to ST312, the state estimation processing of the passenger may be performed in addition to the state estimation processing of the driver in the state estimation processing of ST305.

As described above, when the state of the driver is not normal, which is a case where the influence on safety is large during driving, the detection target of the occupant detection unit 4 is determined as one of the occupants, that is, the driver, and when the state of the driver is normal, which is a case where the influence on safety is small during driving, the detection target of the occupant detection unit 4 is determined as both the occupants, that is, the driver and a passenger, whereby the processing load of the occupant detection processing can be reduced when the influence on safety is large during driving.

Note that the processing of ST301 to ST312 described above is repeated until the operation of the occupant detection device 90 is completed. Here, the detection target of the occupant detection unit 4 changes as needed depending on a determination result by the detection target determining unit 8 as to whether the detection target of the occupant detection unit 4 is one of the occupants or both the occupants. For example, when the detection target determining unit 8 determines that the detection target is the driver and the passenger in the processing of ST306, the occupant detection unit 4 detects the driver and the passenger in the processing of ST309 to ST312, and then the detection target determining unit 8 determines that the detection target is one of the occupants, that is, the driver in the processing of ST306, the occupant detection unit 4 detects the driver by excluding the passenger who is the other of the occupants different from the one of the occupants from the detection targets in the processing of ST301 to ST304.

On the other hand, for example, when the detection target determining unit 8 determines that the detection target is the driver in the processing of ST306, the occupant detection unit 4 detects the driver in the processing of ST301 to ST305, and then the detection target determining unit 8 determines that the detection target is the driver and the passenger in the processing of ST306 again, the occupant detection unit 4 determines not only the driver who is one of the occupants but also the passenger who is the other of the occupants different from the one of the occupants as the detection target. As described above, since the detection target of the occupant detection unit 4 changes as needed, the processing load can be adjusted even when the occupant detection device 90 is operating.

Note that, in the present embodiment, the operation example of the occupant detection device 90 has been described with an example in which the occupant detection device 90 detects the face region of the occupant in the processing of ST304 and ST312, but when the feature information detection unit 7 does not perform the processing of extracting the face parts of the occupant, the processing of ST304 and ST312 can be omitted.

Further, in the operation example of the occupant detection device 90 described above, an example in which the processing of ST301 to ST305 is performed with the detection target of the occupant detection unit 4 as the driver after the operation of the occupant detection device 90 is started has been described, but the processing at the start of the operation of the occupant detection device 90 is not limited to the above-described example. For example, after the operation of the occupant detection device 90 is started, the detection target of the occupant detection unit 4 may be determined as the driver and the passenger, and the processing of ST309 to ST312 may be performed. That is, after the operation of the occupant detection device 90 is started, the occupant detection processing is performed with the driver and the passenger as the detection targets (ST309 to ST312), and if the driver is not normal in the driver state estimation processing (ST305), the driver may be determined as the detection target (ST306; YES), and the occupant detection processing may be performed by the occupant detection unit 4. Note that, also in this case, if the driver is normal in the driver state estimation processing (ST305), the driver and the passenger may be determined as the detection targets (ST306; NO), and the occupant detection processing may be performed by the occupant detection unit 4.

Note that, in the present embodiment, as in the first embodiment, the occupant detection device 90 may perform the occupant detection processing with the driver and the passenger as the detection target when the driver or the passenger gets in the vehicle, and may perform the occupant detection processing with the driver as the detection target when the set time has elapsed since the driver or the passenger gets in the vehicle. For example, the processing operation in the occupant detection device 90 may be a combination of the processing of ST101 to ST113 described with reference to FIG. 5 and the processing of ST301 to ST312 described with reference to FIG. 9. In this case, which of the determination results of ST102 and ST306 is prioritized may be determined in any manner, and for example, when the determination results of ST102 and ST306 match, the determination result of the detection target determining unit 3 may be output to the occupant detection unit 4.

In addition, in the present embodiment, as in the second embodiment, the occupant detection device 90 may perform the occupant detection processing with the driver and the passenger as the detection targets when the vehicle is stopped, and may perform the occupant detection processing with the driver as the detection target at the time of traveling of the vehicle. For example, the processing operation in the occupant detection device 90 may be a combination of the processing of ST201 to ST212 described with reference to FIG. 7 and the processing of ST301 to ST312 described with reference to FIG. 9. In this case, which of the determination results of ST202 and ST306 is prioritized may be determined in any manner, and for example, when the determination results of ST202 and ST306 match, the determination result of the detection target determining unit may be output to the occupant detection unit 4.

Furthermore, the processing operation in the occupant detection device 90 may be a combination of the processing of ST101 to ST113 described with reference to FIG. 5, the processing of ST201 to ST212 described with reference to FIG. 7, and the processing of ST301 to ST312 described with reference to FIG. 9. In this case, which of the determination results of ST102, ST202, and ST306 is prioritized may be determined in any manner, and for example, when the determination results of ST102, ST202, and ST306 match, the determination result of the detection target determining unit may be output to the occupant detection unit 4.

In addition, in a case where the occupant detection unit 4 does not detect a passenger after determining that the detection target is both the occupants, that is, the driver and the passenger, the detection target may be determined as one of the occupants, that is, the driver. In this manner, it is possible to reduce the processing load by suppressing the occupant detection processing from being performed on the passenger even though the passenger is not present in the vehicle.

Fourth Embodiment

As in the first embodiment, an occupant detection device 90 according to a fourth embodiment includes the image obtaining unit 1 that obtains a captured image, the occupant detection unit 4 that can detect a driver and a passenger in the captured image, and the detection target determining unit 8 that determines whether the detection target of the occupant detection unit 4 is one of the occupants of the driver and the passenger or both the occupants of the driver and the passenger. The present embodiment is different from the first embodiment in that one of the occupants, that is, the passenger is the detection target when the state of the driver is normal, and both the occupants, that is, the driver and the passenger are the detection targets when the state of the driver is not normal. The same components as those in the first embodiment are denoted by the same reference numerals, and the description thereof will be omitted.

As described in the second embodiment, it is necessary to detect the state of the driver in order to implement travel support functions such as prevention of dozing driving and the vehicle evacuation process in an emergency. On the other hand, when there is a low possibility that dozing driving, a sudden change in the physical condition of the occupant, or the like occurs, it is not necessary to constantly detect the driver, and if air conditioning control or the like suitable for the detected occupant is performed with the occupant as the detection target, it is possible to provide a comfortable vehicle interior environment for the driver and the passenger. In addition, when air conditioning control or the like suitable for the passenger is performed, if the authentication unit authenticates the passenger and the passenger can be associated with a specific individual, it is possible to perform air conditioning control, control of an acoustic device, and the like suitable for a specific passenger.

Therefore, the detection target determining unit 8 of the present embodiment determines that the detection target of the occupant detection unit 4 is both the occupants, that is, the driver and the passenger when the state of the driver is not normal, and determines that the detection target of the occupant detection unit 4 is one of the occupants, that is, the passenger when the state of the driver is normal. Note that the occupant detection device 90 according to the present embodiment includes the state estimating unit 13 as in the third embodiment.

First, the state estimating unit 13 will be described. As in the third embodiment, the state estimating unit 13 is connected to the occupant detection unit 4, and estimates the state of the occupant using the feature information detected by the feature information detection unit 7 of the occupant detection unit 4. The state of the occupant is, for example, a state related to drowsiness of the occupant, a state related to attention of the occupant to driving, a state related to physical condition of the occupant, and the like. Then, the state estimating unit 13 estimates the index value of the state related to the drowsiness of the occupant, the index value of the state related to the attention of the occupant to driving, and the index value of the state related to the physical condition of the occupant, that is, the wakefulness level, the attention level, and the health level.

Then, the detection target determining unit 8 determines whether the detection target of the occupant detection unit 4 is one of the occupants or both the occupants by using the state estimation result of the occupant by the state estimating unit 13. The detection target determining unit 8 obtains at least one of the wakefulness level, the attention level, and the health level as the state estimation result from the state estimating unit 13, and checks whether or not the state of the occupant is normal. Here, the state of the occupant being normal refers to a case where the wakefulness level, the attention level, or the health level obtained from the state estimating unit 13 is equal to or more than a set threshold value, and the state of the occupant being not normal refers to a case where the wakefulness level, the attention level, or the health level obtained from the state estimating unit 13 is less than the set threshold value.

Note that the state of the occupant being not normal includes not only a case where an abnormality has already occurred in the occupant, such as a case where the occupant falls asleep, but also a case where an abnormality may occur in the occupant, such as a case where the occupant feels drowsy. Furthermore, the threshold values set for the wakefulness level, the attention level, and the health level are not necessarily the same among the wakefulness level, the attention level, and the health level, and may be different among the wakefulness level, the attention level, and the health level.

For example, when at least one of the wakefulness level, the attention level, and the health level obtained from the state estimating unit 13 is less than a set threshold value, the detection target determining unit 8 determines that the state of the occupant is not normal, and determines that the detection target of the occupant detection unit 4 is the driver and the passenger. On the other hand, for example, when all of the wakefulness level, the attention level, and the health level obtained from the state estimating unit 13 are equal to or more than the set threshold value, the detection target determining unit 8 determines that the state of the occupant is normal and that the detection target of the occupant detection unit 4 is the passenger.

Note that the determination as to whether or not the state of the occupant is normal by the detection target determining unit 8 is not limited to whether or not all of the wakefulness level, the attention level, and the health level are equal to or more than the set threshold value, and may be made based on whether or not an index value comprehensively calculated using the wakefulness level, the attention level, and the health level is equal to or more than the set threshold value. Here, the set threshold value in the third embodiment and the set threshold value in the fourth embodiment may be different values.

Figure 10:
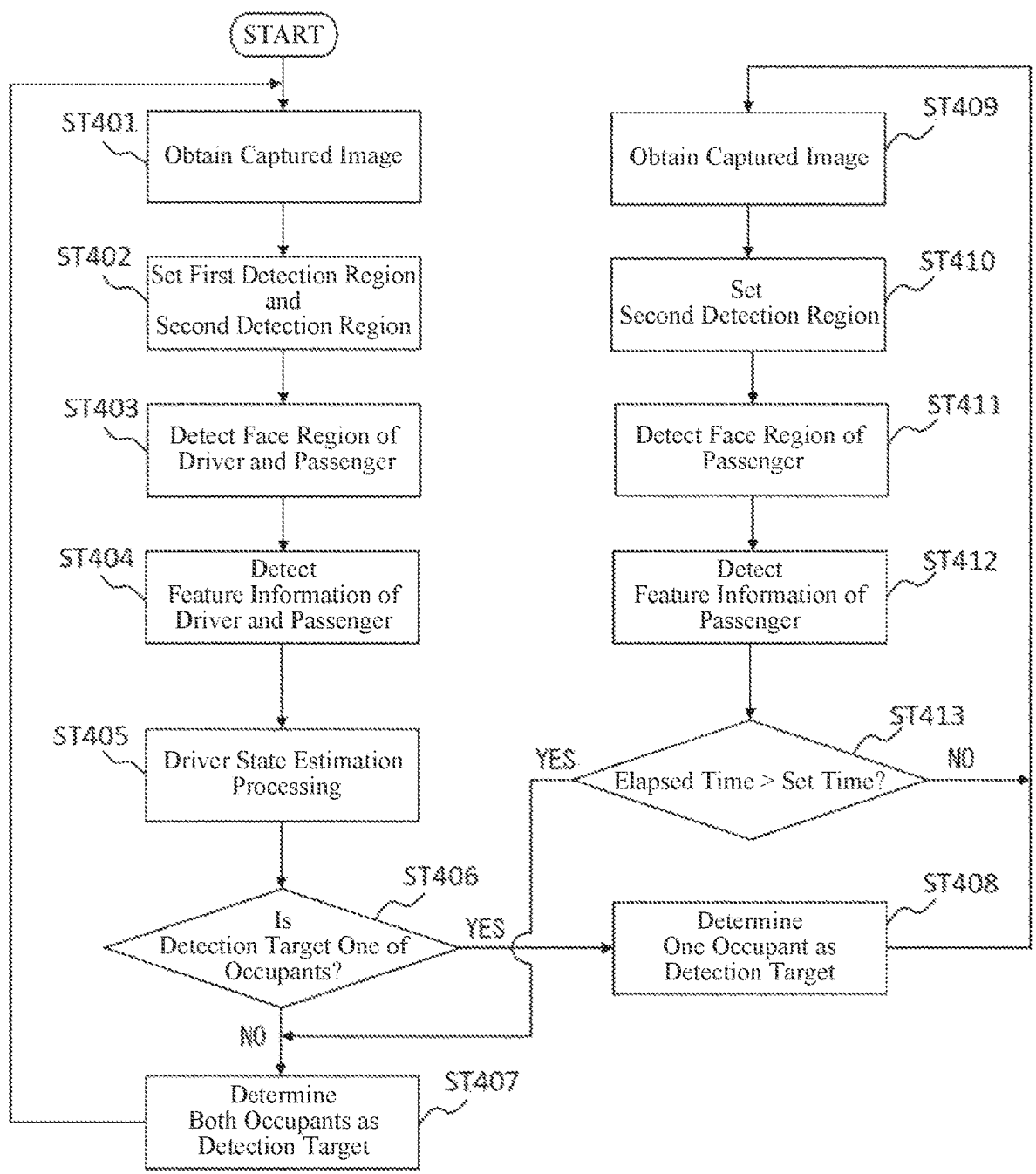
FIG. 10 is a flowchart illustrating an operation example of an occupant detection device according to a fourth embodiment.

Then, the occupant detection unit 4 detects the driver or the driver and the passenger by using the determination result of the detection target determining unit 8. Next, the operation of the occupant detection device 90 will be described. FIG. 10 is a flowchart illustrating an operation example of the occupant detection device 90 according to the fourth embodiment. For example, when the vehicle information obtaining unit 2 obtains a signal indicating that any door of the vehicle is opened and a signal indicating that the engine of the vehicle is started from the vehicle-side control device 200, the occupant detection device 90 starts the operation of the occupant detection processing. Further, although the flowchart of FIG. 10 does not illustrate processing for ending the operation of the occupant detection device 90, the occupant detection device 90 ends the operation of the occupant detection processing, for example, when the vehicle information obtaining unit 2 obtains a signal indicating that the engine of the vehicle is stopped from the vehicle-side control device 200.

First, after the operation of the occupant detection device 90 is started, the image obtaining unit 1 obtains a captured image from the imaging device 20 (ST401). Next, the detection region setting unit 5 of the occupant detection unit 4 sets the first detection region and the second detection region in the captured image (ST402). Then, the face region detection unit 6 of the occupant detection unit 4 detects a face region where the face of the occupant is present, that is, face regions where the faces of the driver and the passenger are each present in the set first detection region and second detection region (ST403). Furthermore, the feature information detection unit 7 of the occupant detection unit 4 performs the feature information detection processing on the occupant whose face region is detected, that is, the driver and the passenger, and detects feature information of the driver and the passenger (ST404). Note that the feature information of the driver and the passenger obtained by the feature information detection processing may be output to at least one of the occupant authentication unit 11, the attribute estimating unit 12, or the state estimating unit 13. Then, the operation of the occupant detection device 90 proceeds to processing of ST405.

Next, the state estimating unit 13 of the occupant detection device 90 obtains the feature information of the driver from the feature information detection unit 7, and performs the driver state estimation processing (ST405). The driver state estimation processing by the state estimating unit 13 is a process of estimating the wakefulness level, the attention level, and the health level of the driver using the feature information, for example. In the following description, an example will be described in which the state estimating unit 13 estimates the wakefulness level of the driver, and the detection target determining unit 8 determines whether the detection target of the occupant detection unit 4 is one of the occupants, that is, the passenger, or both the occupants, that is, the driver and the passenger, using the wakefulness level of the driver.

First, the detection target determining unit 8 obtains a state estimation result from the state estimating unit 13. Then, the detection target determining unit 8 checks whether or not the driver is normal, and determines whether the detection target of the occupant detection unit 4 is one of the occupants or both the occupants (ST406). For example, the detection target determining unit 8 obtains the wakefulness level of the driver from the state estimating unit 13 as a state result, and determines that the state of the driver is normal when the wakefulness level is equal to or more than a set threshold value. On the other hand, if the wakefulness level of the driver is less than the set threshold value, the detection target determining unit 8 determines that the state of the driver is not normal.

When it is confirmed from the state estimation result that the driver is not normal, the detection target determining unit 8 determines that the detection target of the occupant detection unit 4 is the driver and the passenger (ST406; NO). Then, the detection target determining unit 8 outputs a determination result indicating that the detection target is the driver and the passenger to the occupant detection unit 4, and determines both the occupants, that is, the driver and the passenger as the detection targets (ST407).

When the occupant detection unit 4 obtains the determination result indicating that the detection target is the driver and the passenger from the detection target determining unit 8, the process proceeds to ST401, and as described above, the occupant detection unit 4 performs the occupant detection processing with the driver and the passenger as the detection targets in the processing of ST401 to ST404. First, the image obtaining unit 1 obtains a captured image from an imaging device (ST401). Next, the detection region setting unit 5 of the occupant detection unit 4 sets the first detection region and the second detection region in the captured image (ST402). Then, the face region detection unit 6 of the occupant detection unit 4 detects face regions where the faces of the driver and the passenger are each present in the detection region (ST403). Furthermore, the feature information detection unit 7 of the occupant detection unit 4 performs the feature information detection processing on the driver and the passenger, and detects feature information of the driver and the passenger (ST404).

On the other hand, when it is confirmed from the state estimation result that the driver is normal, the detection target determining unit 8 determines that the detection target of the occupant detection unit 4 is a passenger (ST406; YES). Then, the detection target determining unit 8 outputs a determination result indicating that the detection target is the passenger to the occupant detection unit 4, and determines one of the occupants, that is, the passenger, as the detection target.

When the occupant detection unit 4 obtains the determination result indicating that the detection target is the passenger from the detection target determining unit 8, the occupant detection unit 4 performs the occupant detection processing with the passenger as the detection target. First, the image obtaining unit 1 obtains a captured image from an imaging device (ST409). Then, the detection region setting unit 5 of the occupant detection unit 4 sets the second detection region in the captured image (ST410).

Then, the face region detection unit 6 of the occupant detection unit 4 detects a face region where the face of the occupant is present, that is, a face region where the face of the passenger is present in the set second detection region (ST411). Furthermore, the feature information detection unit 7 of the occupant detection unit 4 performs the feature information detection processing on the occupant whose face region is detected, that is, the passenger, and detects feature information of the passenger (ST412). Note that the feature information of the passenger obtained by the feature information detection processing may be output to at least one of the occupant authentication unit 11, the attribute estimating unit 12, or the state estimating unit 13. Furthermore, the occupant authentication unit 11 may perform the attribute estimation processing on the passenger. Similarly, the attribute estimating unit 12 may perform the attribute estimation processing on the passenger. Further, the state estimating unit 13 may perform the state estimation processing on the passenger.

Next, the detection target determining unit 8 determines whether or not a time (hereinafter referred to as elapsed time) elapsed from the determination that the detection target of the occupant detection unit 4 is the passenger exceeds a set time (ST413). When the detection target determining unit 8 determines that the elapsed time exceeds the set time (ST413; YES), the operation of the occupant detection device 90 proceeds to the processing of ST401, and as described above, the occupant detection processing is performed with the driver and the passenger as the detection targets in the processing of ST401 to ST404. Since the state such as the drowsiness and the physical condition of the driver changes with time, when the time set after setting only the passenger as the detection target of the occupant detection unit 4 elapses, and then by setting the detection target of the occupant detection unit 4 as the driver and the passenger, the state of the driver can be detected even if the state of the driver rapidly deteriorates.

On the other hand, when the detection target determining unit 8 determines that the elapsed time does not exceed the set time (ST412; NO), the operation of the occupant detection device 90 proceeds to the processing of ST409, and as described above, the occupant detection processing is performed with the driver and the passenger as the detection targets in the processing of ST409 to ST412.

As described above, when the state of the driver is normal, which is a case where the influence on safety is small during driving, the detection target of the occupant detection unit 4 is determined as one of the occupants, that is, the passenger, and when the state of the driver is not normal, which is a case where the influence on safety is large during driving, the detection target of the occupant detection unit 4 is determined as the driver and the passenger, whereby only one of the occupants, that is, the passenger is detected when the influence on safety is small during driving, and thus the processing load of the occupant detection processing can be reduced.

Note that the processing of ST401 to ST412 described above is repeated until the operation of the occupant detection device 90 is completed. Here, the detection target of the occupant detection unit 4 changes as needed depending on a determination result by the detection target determining unit 8 as to whether the detection target of the occupant detection unit 4 is one of the occupants or both the occupants. For example, when the detection target determining unit 8 determines that the detection target is the driver and the passenger in the processing of ST406, the occupant detection unit 4 detects the driver and the passenger in the processing of ST401 to ST404, and then the detection target determining unit 8 determines that the detection target is one of the occupants, that is, the passenger in the processing of ST406, the occupant detection unit 4 detects the passenger excluding the driver who is the other of the occupants different from the one of the occupants from the detection target in the processing of ST409 to ST412.

On the other hand, for example, when the detection target determining unit 8 determines that the detection target is a passenger in the processing of ST406, the occupant detection unit 4 detects a passenger in the processing of ST409 to ST412, and then the detection target determining unit 8 determines that the detection target is the driver and the passenger in the processing of ST406 again, the occupant detection unit 4 determines not only the passenger who is one of the occupants but also the driver who is the other of the occupants different from the one of the occupants as the detection target. As described above, since the detection target of the occupant detection unit 4 changes as needed, the processing load can be adjusted even when the occupant detection device 90 is operating.

Note that, in the present embodiment, the operation example of the occupant detection device 90 has been described with an example in which the occupant detection device 90 detects the face region of the occupant in the processing of ST404 and ST412, but when the feature information detection unit 7 does not perform the processing of extracting the face parts of the occupant, the processing of ST404 and ST412 can be omitted.

Further, in the operation example of the occupant detection device 90 described above, an example in which the processing of ST401 to ST405 is performed with the detection target of the occupant detection unit 4 as the driver and the passenger after the operation of the occupant detection device 90 is started has been described, but the processing at the start of the operation of the occupant detection device 90 is not limited to the above-described example. For example, after the operation of the occupant detection device 90 is started, the occupant detection processing may be performed with the detection target of the occupant detection unit 4 as the driver. That is, after the operation of the occupant detection device 90 is started, the occupant detection processing is performed with the driver as the detection target, and if the driver is normal in the driver state estimation processing (ST405), the occupant detection processing is performed with the passenger as the detection target (ST406; YES), the occupant detection processing may be performed by the occupant detection unit 4. Note that, also in this case, if the driver is not normal in the driver state estimation processing (ST406), it is sufficient if the occupant detection processing is performed by the occupant detection unit 4 with the driver and the passenger as the detection targets (ST406; NO).

Note that, in the present embodiment, as in the first embodiment, the occupant detection device 90 may perform the occupant detection processing with the driver and the passenger as the detection target when the driver or the passenger gets in the vehicle, and may perform the occupant detection processing with the driver as the detection target when the set time has elapsed since the driver or the passenger gets in the vehicle. For example, the processing operation in the occupant detection device 90 may be a combination of the processing of ST101 to ST113 described with reference to FIG. 5 and the processing of ST401 to ST413 described with reference to FIG. 10. In this case, which of the determination results of ST102 and ST406 is prioritized may be determined in any manner, and for example, when the determination results of ST102 and ST406 match, the determination result of the detection target determining unit 3 may be output to the occupant detection unit 4.

In addition, in the present embodiment, as in the second embodiment, the occupant detection device 90 may perform the occupant detection processing with the driver and the passenger as the detection targets when the vehicle is stopped, and may perform the occupant detection processing with the driver as the detection target at the time of traveling of the vehicle. For example, the processing operation in the occupant detection device 90 may be a combination of the processing of ST201 to ST212 described with reference to FIG. 7 and the processing of ST401 to ST413 described with reference to FIG. 10. In this case, which of the determination results of ST202 and ST406 is prioritized may be determined in any manner, and for example, when the determination results of ST202 and ST406 match, the determination result of the detection target determining unit 3 may be output to the occupant detection unit 4.

Furthermore, the processing operation in the occupant detection device 90 may be a combination of the processing of ST101 to ST113 described with reference to FIG. 5, the processing of ST201 to ST212 described with reference to FIG. 7, and the processing of ST401 to ST413 described with reference to FIG. 10. In this case, which of the determination results of ST102, ST202, and ST406 is prioritized may be determined in any manner, and for example, when the determination results of ST102, ST202, and ST406 match, the determination result of the detection target determining unit 3 may be output to the occupant detection unit 4.

In addition, in a case where the occupant detection unit 4 does not detect a passenger after determining that the detection target is both the occupants, that is, the driver and the passenger, the detection target may be determined as one of the occupants, that is, the driver. In this manner, it is possible to reduce the processing load by suppressing the occupant detection processing from being performed on the passenger even though the passenger is not present in the vehicle.

Note that, in the present embodiment, as in the third embodiment, the occupant detection device 90 may perform the occupant detection processing with both the occupants, that is, the driver and the passenger, as the detection target when the state of the driver is normal, and may set one of the occupants, that is, the driver, as the detection target when the driver is not normal. In this case, it is sufficient if a plurality of threshold values used for comparison with index values indicating the state of the driver, such as wakefulness level, attention level, and health level, is provided, and whether the detection target is one of the occupants or both the occupants is determined by determination processing to be described next on the basis of whether or not the index value is equal to or more than the threshold value.

Figure 11:
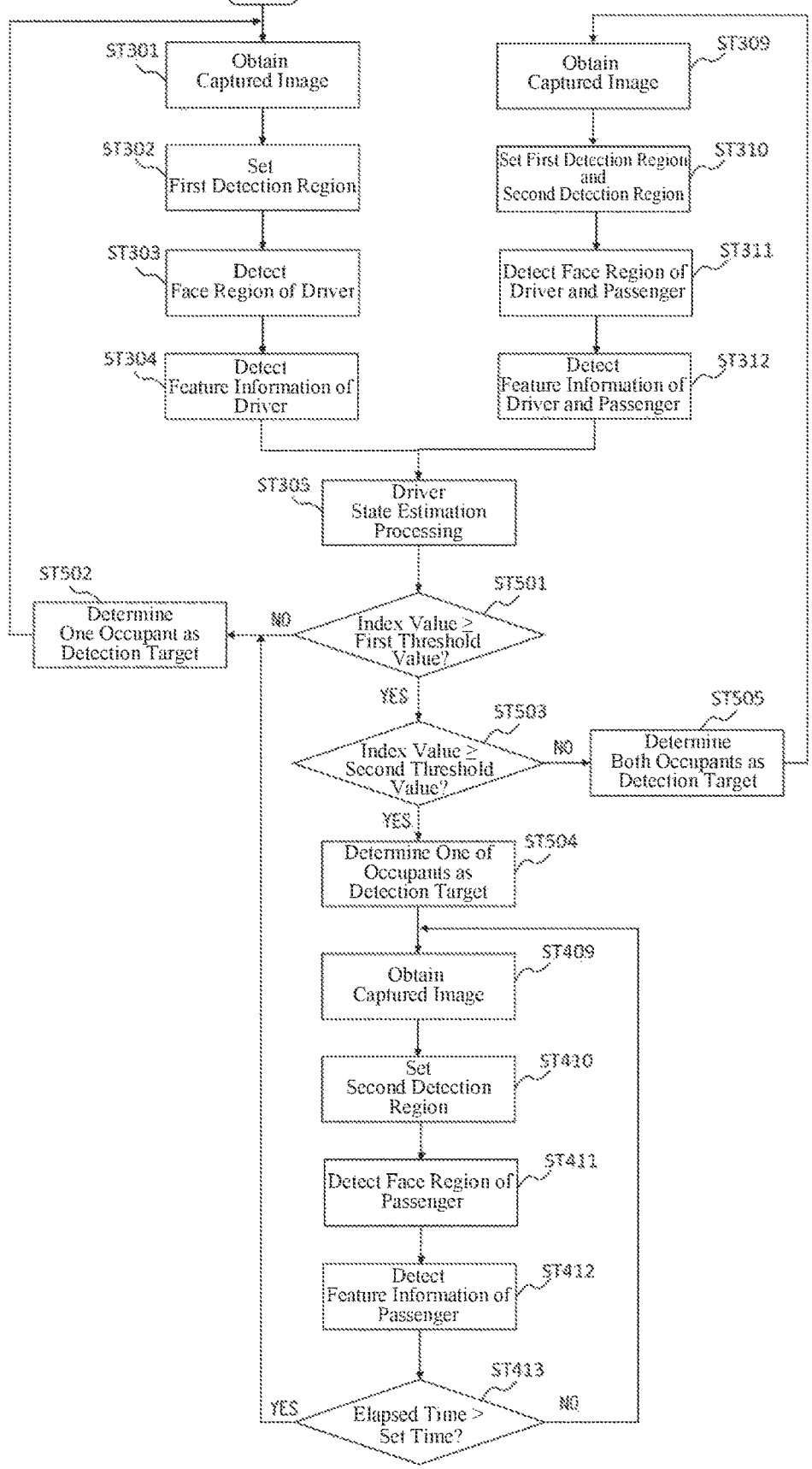
FIG. 11 is a flowchart illustrating an operation example of the occupant detection device according to the fourth embodiment.

FIG. 11 is a flowchart illustrating an operation example of the occupant detection device 90 according to the fourth embodiment. For example, as shown in FIG. 11, in the processing of ST501 and ST503, the detection target determining unit 8 compares the index value indicating the state of the driver with a first threshold value and a second threshold value. Note that the second threshold value has a value larger than the first threshold value. When the index value is less than the first threshold value (ST501; NO), that is, when the state of the driver is not normal, the detection target determining unit 8 determines that the driver is the detection target, and determines one of the occupants, that is, the driver, as the detection target (ST502).

On the other hand, when the index value is equal to or more than the first threshold value (ST501; YES), the detection target determining unit 8 compares the index value with the second threshold value. When the index value is equal to or more than the second threshold value (ST503; YES), that is, when the state of the driver is normal, the detection target determining unit 8 determines that the passenger is the detection target, and determines one of the occupants, that is, the passenger, as the detection target (ST504).

Further, when the index value is equal to or more than the first threshold value and less than the second threshold value (ST503; NO), the detection target determining unit 8 determines that the driver and the passenger are the detection target, and determines that both the occupants, that is, the driver and the passenger are the detection target (ST505). In this manner, with respect to the occupant detection device 90 that detects the driver and the passenger, in a case where the influence on safety is large during driving, only the driver can be determined as the detection target, and in a case where the influence on safety is small during driving, only the passenger can be determined as the detection target, so that the processing load of the occupant detection device 90 can be reduced.

Note that, in the first to fourth embodiments, when the detection target of the occupant detection unit 4 is one of the occupants, the detection region set in the captured image and corresponding to the seat of one of the occupants may be reduced if a predetermined condition is satisfied. Note that, when the detection region is reduced, it is sufficient if the detection region is reduced to include at least the face of the occupant by the detection region setting unit 5 of the occupant detection unit 4. The predetermined condition is, for example, a case where the occupant detection unit 4 obtains a signal indicating that the authentication processing, the attribute estimation processing, or the state estimation processing has been performed on one of the occupants. In addition, the occupant detection unit 4 may further include a gesture detection unit (not illustrated) that detects a gesture performed by the occupant in the detection region, and when obtaining a signal indicating that the gesture detection is performed, the occupant detection unit 4 may determine that a predetermined condition is satisfied and reduce the detection region corresponding to one of the occupants. Note that, also in a case where the detection target of the occupant detection unit 4 is both the occupants, the detection region setting unit 5 may similarly reduce the detection region set in the captured image corresponding to the seats of both the occupants. In a case where the occupant is detected by searching the detection region, the processing cost required for the occupant detection processing decreases as the detection region decreases, and thus, as described above, if the detection region is reduced, the processing load of the occupant detection devices 10 and 90 can be reduced.

In addition, each embodiment disclosed in the present specification can be freely combined within the scope thereof, and each embodiment can be appropriately modified or omitted.

REFERENCE SIGNS LIST

1: image obtaining unit (image obtainer), 2: vehicle information obtaining unit (vehicle information obtainer), 3, 8: detection target determining unit (detection target determiner), 4: occupant detection unit (occupant detector), 5: detection region setting unit (detection region definer), 6:

face region detection unit (face region detector), 7: feature information detection unit (feature information detector), 10, 90: occupant detection device, 11: occupant authentication unit (occupant authenticator), 12: attribute estimating unit (attribute estimator), 13: state estimating unit (state estimator), 30: vehicle, 31: driver seat, 32: passenger seat, 33: rear left seat, 34: rear center seat, 35: rear right seat, 41: driver, 42, 43: occupant, 51, 52, 53, 54, 55: headrest, 60: captured image, 61, 62: detection region, 71, 72: face region, 81: left eye, 82: right eye, 83: nose, 84: mouth, 100, 101: occupant detection system

The invention claimed is:

1. An occupant detection device, comprising:
   an image obtainer to obtain a captured image from an imaging device, where in an imaging range of the image obtainer includes a driver present in a driver seat of a vehicle and a passenger present in a passenger seat or a rear seat of the vehicle;
   an occupant detector to obtain the captured image from the image obtainer, the occupant detector being capable of detecting the driver and the passenger in the captured image; and
   a detection target determiner to determine whether a detection target of the occupant detector is one of occupants of the driver and the passenger or both of the occupants of the driver and the passenger, wherein
   the occupant detector, when the detection target determiner determines the detection target as the one of the occupants, detects the one of the occupants in the captured image, and when the detection target determiner determines the detection target as both the occupants, detects both the occupants in the captured image.

2. The occupant detection device according to claim 1, wherein
   when the detection target determiner determines the detection target as both the occupants, and the detection target determiner determines the detection target as the one of the occupants after both the occupants being detected, the occupant detector excludes, from the detection target, the other of the occupants different from the one of the occupants of the driver and the passenger in the captured image, and detects the one of the occupants in the captured image.

3. The occupant detection device according to claim 1, wherein
   when the detection target determiner determines the detection target as the one of the occupants, and the detection target determiner determines the detection target as both the occupants after the one of the occupants being detected, the occupant detector adds the other of the occupants different from the one of the occupants of the driver and the passenger in the captured image to the detection target, and detects both the occupants in the captured image.

4. The occupant detection device according to claim 1, wherein
   the detection target determiner, when the driver or the passenger gets in the vehicle, determines the detection target of the occupant detector as both the occupants, and when a set time has elapsed since the driver or the passenger has got into the vehicle, determines the detection target of the occupant detector as the driver.

5. The occupant detection device according to claim 1, wherein
   the detection target determiner, when the driver or the passenger gets in the vehicle, determines the detection target of the occupant detector as both the occupants, and when a sensor for detecting a seating of an occupant mounted on the vehicle detects the driver and the passenger being seated on seats of the vehicle, determines the detection target of the occupant detector as the driver.

6. The occupant detection device according to claim 1, further comprising:
   an occupant authenticator to authenticate the passenger detected by the occupant detector, wherein
   the detection target determiner, when the driver or the passenger gets in the vehicle, determines the detection target of the occupant detector as both the occupants, and when the passenger has been authenticated by the occupant authenticator, determines the detection target of the occupant detector as the driver.

7. The occupant detection device according to claim 1, further comprising:
   an attribute estimator to estimate an attribute of the passenger detected by the occupant detector, wherein
   the detection target determiner, when the driver or the passenger gets in the vehicle, determines the detection target of the occupant detector as both the occupants, and when the attribute of the passenger has been estimated by the attribute estimator, determines the detection target of the occupant detector as the driver.

8. The occupant detection device according to claim 1, further comprising:
   a state estimator to estimate a state of the passenger detected by the occupant detector, wherein
   the detection target determiner, when the driver or the passenger gets in the vehicle, determines the detection target of the occupant detector as both the occupants, and when the state of the passenger has been estimated by the state estimator, determines the detection target of the occupant detector as the driver.

9. The occupant detection device according to claim 1, wherein
   the detection target determiner, when the one of the occupants gets off the vehicle in which both the occupants being on board, determines the detection target of the occupant detector as the other of the occupants different from the one of the occupants of the driver and the passenger.

10. The occupant detection device according to claim 1, wherein
    the detection target determiner, when information indicating stop status of the vehicle is obtained, determines the detection target of the occupant detector as both the occupants, and when information indicating moving status of the vehicle is obtained, determines the detection target of the occupant detector as the driver, where the information being one obtained from a vehicle-side controller controlling an onboard device mounted on the vehicle.

11. The occupant detection device according to claim 1, wherein
    the detection target determiner, when information indicating the stop status of the vehicle is obtained, determines the detection target of the occupant detector as the passenger, and when the information indicating the moving status of the vehicle is obtained, determines the detection target of the occupant detector as both the occupants, where the information being one obtained from a vehicle-side controller controlling an onboard device mounted on the vehicle.

12. The occupant detection device according to claim 1, wherein
the detection target determiner, when information indicating automated driving status of the vehicle is obtained, determines the detection target of the occupant detector as both the occupants, and when information indicating manually driving status of the vehicle is obtained, determines the detection target of the occupant detector as the driver, where the information being one obtained from a vehicle-side controller controlling an onboard device mounted on the vehicle.

13. The occupant detection device according to claim 1, further comprising:
a state estimator to estimate a state of the driver detected by the occupant detector, wherein
the detection target determiner, when an estimation result of the state estimator indicates the state of the driver being normal, determines the detection target of the occupant detector as both the occupants, and when the estimation result of the state estimator indicates the state of the driver being not normal, determines the detection target of the occupant detector as the driver.

14. The occupant detection device according to claim 1, further comprising:
a state estimator to estimate a state of the driver detected by the occupant detector, wherein
the detection target determiner, when an estimation result of the state estimator indicates the state of the driver being normal, determines the detection target of the occupant detector as the passenger, and when the estimation result of the state estimator indicates the state of the driver being not normal, determines the detection target of the occupant detector as both the occupants.

15. The occupant detection device according to claim 1, further comprising,
a state estimator to estimate an index value indicating a state of the driver detected by the occupant detector, wherein
the detection target determiner, when the index value being less than a first threshold value, determines the detection target of the occupant detector as the driver, when the index value being equal to or more than a second threshold value, where the second threshold value being larger than the first threshold value, determines the detection target of the occupant detector as the passenger, and when the index value being equal to or more than the first threshold value and less than the second threshold value, determines the detection target of the occupant detector as both the occupants.

16. The occupant detection device according to claim 1, wherein
the occupant detector sets a detection region to detect an occupant in the captured image, and detects an occupant within the reduced detection region.

17. An occupant detection system, comprising:
an imaging device being mounted in a vehicle, where in an imaging range of the imaging device includes a driver present in a driver seat of the vehicle and a passenger present in a passenger seat or a rear seat of the vehicle;
an image obtainer to obtain a captured image from the imaging device;
an occupant detector to obtain the captured image from the image obtainer, the occupant detector being capable of detecting the driver and the passenger in the captured image; and
a detection target determiner to determine whether a detection target of the occupant detector is one of occupants of the driver and the passenger or both of the occupants of the driver and the passenger, wherein
the occupant detector, when the detection target determiner determines the detection target as the one of the occupants, detects the one of the occupants in the captured image, and when the detection target determiner determines the detection target as both the occupants, detects both the occupants in the captured image.

18. An occupant detection method, comprising:
obtaining, by an image obtainer, a captured image from an imaging device, where in an imaging range of the image obtainer includes a driver present in a driver seat of a vehicle and a passenger present in a passenger seat or a rear seat of the vehicle;
obtaining, by an occupant detector, the captured image from the image obtainer, the occupant detector being capable of detecting the driver and the passenger in the captured image; and
determining, by a detection target determiner, whether a detection target of the occupant detector is one of occupants of the driver and the passenger or both of the occupants of the driver and the passenger, wherein
the occupant detector, when the detection target determiner determines the detection target as the one of the occupants, detects the one of the occupants in the captured image, and when the detection target determiner determines the detection target as both the occupants, detects both the occupants in the captured image.

* * * * *